United States Patent [19]
Atkin

[11] Patent Number: 6,145,066
[45] Date of Patent: Nov. 7, 2000

[54] COMPUTER SYSTEM WITH TRANSPARENT DATA MIGRATION BETWEEN STORAGE VOLUMES

[75] Inventor: Carey Phillip Atkin, Marietta, Ga.

[73] Assignee: Amdahl Corporation, Sunnyvale, Calif.

[21] Appl. No.: 08/971,473

[22] Filed: Nov. 14, 1997

[51] Int. Cl.[7] ................................................ G06F 13/00
[52] U.S. Cl. ......................... 711/165; 711/161; 711/114; 709/208
[58] Field of Search ....................... 711/162, 161, 711/165, 111, 112, 114, 5; 714/5, 6, 7; 709/208, 211, 216, 217

[56] References Cited

U.S. PATENT DOCUMENTS

| | | | |
|---|---|---|---|
| 4,638,424 | 1/1987 | Beglin et al. | 711/112 |
| 5,276,867 | 1/1994 | Kenley et al. | 711/162 |
| 5,564,037 | 10/1996 | Lam | 711/161 |
| 5,680,640 | 10/1997 | Ofek et al. | 711/162 |
| 5,832,274 | 11/1998 | Cutler et al. | 395/712 |
| 5,835,954 | 11/1998 | Duyanovich et al. | 711/162 |

*Primary Examiner*—Glenn Gossage
*Attorney, Agent, or Firm*—David E. Lovejoy

[57] ABSTRACT

A computer system includes a transparent data migration facility (TDNff) to accomplish automated movement of data (migration) from one location to another in the system. A data migration program includes a main module to control the start of a migration session when said application programs are using data accessed to and from the source volume, to migrate data from the source volume to the target volume, and to end the migration session whereby the application programs are using data accessed to and from the target volume. The data migration program includes a volume module to control the volumes during the migration session. The data migration program includes a copy module to control the copying of data from the source module to the target module during the migration session. The data migration program includes a monitor module for monitoring I/O transfers to the data volumes during the migration sessions. The computer system may have a plurality of operating systems associated with instances of the data migration program which allows for concurrent data migrations. The plurality of instances of the data migration program may also be controlled in a master slave relationship. A migration session may include a plurality of migration phases such as activation, copy, refresh, quiesce, synchronize, redirect, resume and termination phases.

7 Claims, 6 Drawing Sheets

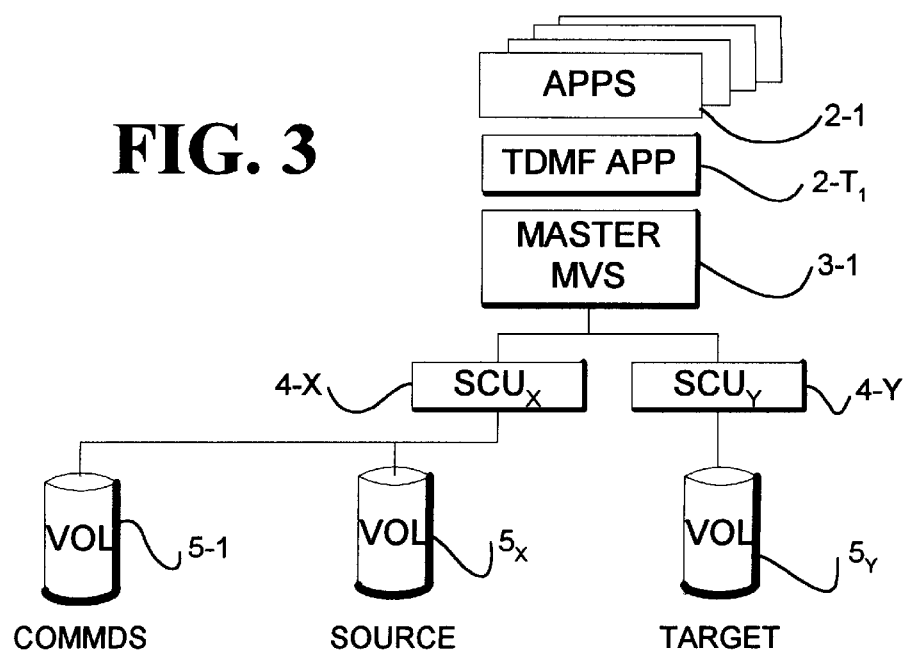
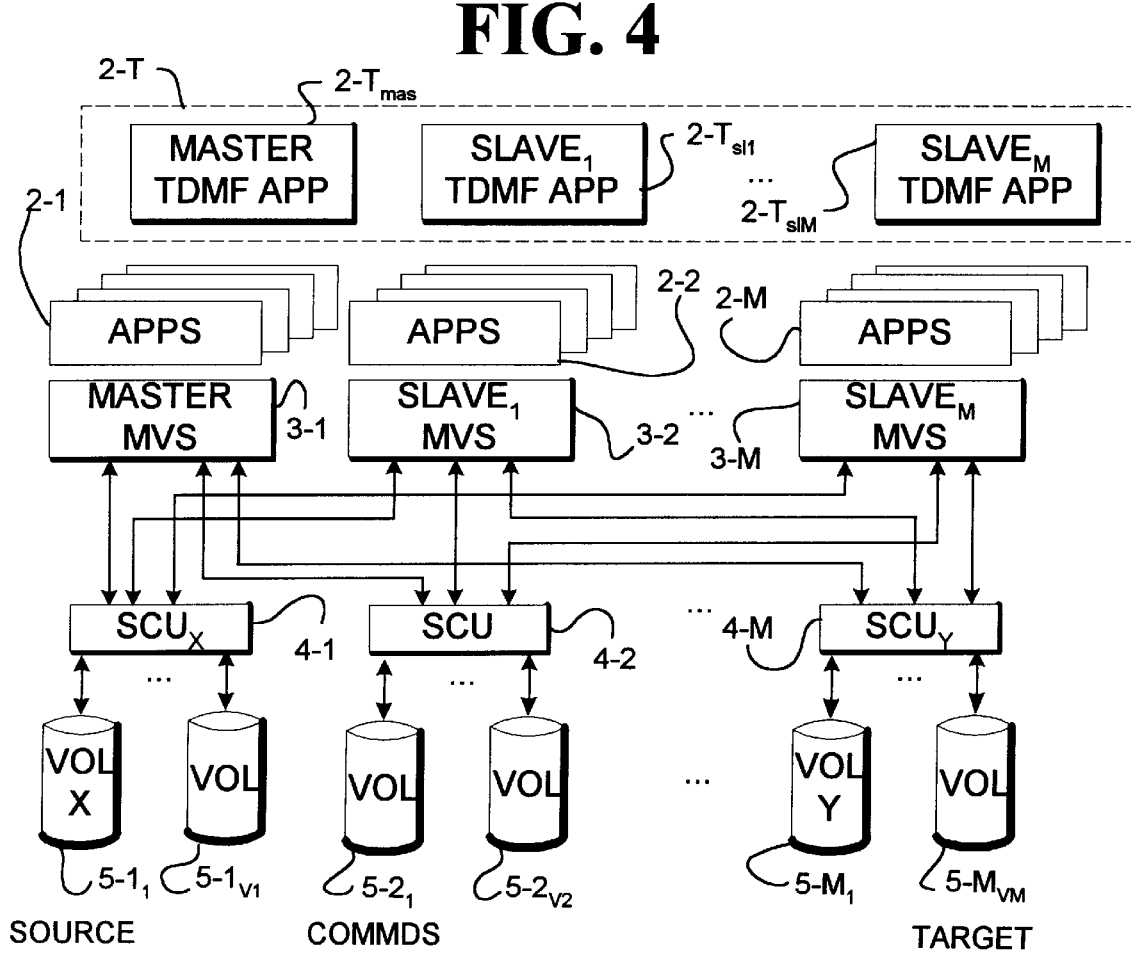

MASTER/SLAVE SYSTEM

COPY SUB-TASK
(One Per Volume Migration For Master Only)

CUSTOMER SIO REQUEST TO
SOURCE/TARGET VOLUME
(For Any Master/Slave System)

I/O INTERRUPT

COMPUTER SYSTEM WITH TRANSPARENT DATA MIGRATION BETWEEN STORAGE VOLUMES

BACKGROUND OF THE INVENTION

The present invention relates to the management and maintenance of large computer systems and particularly to automated methods and apparatus for the movement of data (migration) from location in the system to another.

In 1983, International Business Machines Corporation of Armonk, N.Y. (IBM) described the requirements and capabilities needed in order to efficiently manage and maintain the storage in the modern large data center and to evolve toward automated storage management IBM's Data Facility/System Management Storage (DF/SMS) capabilities. In discussing device support and exploitation, IBM identified the requirement for the timely support and exploitation of new device technologies and the need for tools to simplify the movement of data (migration) to new subsystems.

A standard set of tools has been provided by IBM and other software developers that has allowed data to be automatically copied, archived, and restored. Evolutionary improvements have been made to these tools in the areas of performance, usability, and in some cases data availability; but a problem still exists in that the availability capabilities of these facilities have not kept pace with the availability requirements that exist in data centers. The storage administrator must be able to support the increasing demands of continuous 24 hour by 7day data availability.

There is an explosive growth in the need to store and have on-demand access to greater and greater pools of data. As capacity requirements skyrocket, data availability demands increase. These factors coupled with the need to control costs dictate that new RAID (Redundant Array of Independent Disks) storage technology be implemented. The dilemma faced by data center management is that the implementation of new storage technology is extremely disruptive and therefore conflicts with the need to maximize availability of the data. Therefore, an additional tool is required that will allow data to be nondisruptively relocated or migrated within the data center.

Essentially, a data migration facility provides the ability to "relocate" data from one device to another device. A logical relationship is defined between a device (the source) and another device (the target). The logical relationship between a source and target volume provides the framework for a migration. The data migration facility controls multiple concurrent migrations in a single group that is called a session. A migration is the process that causes the data on the source to be copied to the target.

The characteristics that are critical components of a transparent data migration facility include the following:

The facility is completely transparent to the end user and the application program. No application disruption is required in order to make program changes and the facility is dynamically and nondisruptively activated.

The facility provides for full data access during the data migration. The data on the source volume is available to the end user for read and write access.

The facility provides for a dynamic and nondisruptive takeover of the target volume, when the source and target volumes are synchronized.

The migration facility must ensure complete data integrity.

The migration facility should NOT be restricted to any control unit model type or device type. All devices in the data center should be able to participate in a migration and the facility should support a multiple vendor environment.

The State of the Industry

Migration facilities that exist today were primarily designed for disaster recovery or the facilities were meant to address single volume failures. However, these facilities can also be used as data migration tools. These facilities differ in implementation and use a combination of host software and/or control unit firmware and hardware in order to provide the foundation for the data migration capability.

Local Mirroring

The IBM 3990 host extended feature IBM Dual Copy and the EMC Symmetrix, from EMC Corporation (EMC), mirroring feature are two examples of local mirrors. A source volume and a target volume are identified as a mirrored paired and at the creation of the mirrored pair, data is transparently copied or migrated to the secondary volume. Continuous read and write access by applications is allowed during the data migration process and all data updates are reflected to the secondary volume.

In the case of the IBM 3990 host, the mirror is under the complete control of the system operator. For example, through the use of system commands a mirrored pair can be created. At create time, the data will be copied to a secondary device. At the completion of this copy, the operator can then disconnect the pair and assign the secondary device to be the primary. This is called *Transient Dual Copy* and is an example of Dual Copy being used as a migration facility.

The function of the EMC mirroring feature is to maximize data availability. The EMC subsystem will disconnect the mirror in the event of a failure of one of the paired devices. The mirror will be automatically reconstructed when the failing device is repaired by EMC field engineers. Unlike Dual Copy, the EMC subsystem does not provide an external control mechanism to enable the user to selectively initiate and disconnect mirrored pairs. Therefore, the EMC mirroring feature can not be used as a migration facility.

Standard mirroring has a major restriction that prevents its universal utilization as a transparent data migration tool. The source and target volumes must be attached to the same logical control unit and therefore data can only be relocated within a single control unit. Although limited, this capability is an important tool to the storage administrator.

Remote Mirroring

IBM 3990-6 and EMC Symmetrix features support remote mirroring. A remote mirror function exists when paired devices can exist on different control units and subsystems. The primary objective of this function is to provide a disaster recovery capability. However, a remote mirroring function can also be used as a data migrator.

*DF/SMS eXtended Remote Copy* (*XRC*) is a host-assisted remote mirror method that uses components of DF/SMS and DFP (Data Facility Product). The major component is the System Data Mover (SDM). This component is also used for Concurrent Copy. An IBM 3990-6 (or compatible) host is required as the primary or sending control unit. The secondary or receiving control unit can be an IBM 3990-3 or -6 or compatible host.

Other characteristics of XRC include:

Host application response time is not impacted because updates are reflected on the secondary volume asynchronously. The application does not have to wait for the new data to be copied to the secondary volume. The SDM reads data from the IBM 3990-6 "sidefile" and records the update on log files and then writes to the remote mirror on the recovery control unit.

A common timer is required to insure updates are processed in the correct order and therefore target data integrity is guaranteed in a multiple system environment.

No dynamic takeover is supported. Intervention is required in order to utilize the secondary copy.

To invoke XRC as a data migration facility, the following steps are required. After identification of the source and target pair of devices, an image copy begins and the session is placed in a "duplex pending" state. All users of the source volume have total read and write access to the data. Source updates are reflected on to the target volume. When the copy is complete, the session enters the "duplex" state. The operator must query the pair in order to determine this state change. At this time, all applications using the source volume must be brought down in order to synchronize the source and target devices. Final synchronization is determined by operator command (XQUERY). This query displays a timestamp that represents the time of last update so that the operator can be assured that all updates have been reflected on the target.

Although XRC does have some of the requirements for transparent migration, XRC does not have all of them.

XRC is transparent to the end user and the application program. No application program changes are required and the facility is dynamically activated.

The data on the source volume is available for read and write access during the XRC migration.

XRC causes a disruption because XRC does NOT support a dynamic and nondisruptive takeover of the target volume when the source and target volumes are synchronized. The impact of this disruption can be expensive. All applications with data resident on the source volume must be disabled during the takeover process.

XRC ensures complete data integrity through the use of the journaling data sets and a common timer.

XRC is a relatively "open" facility and therefore supports a multiple vendor environment. Any vendor that supports the IBM 3990-6 XRC specification can participate as the sending or receiving control unit in an XRC session. Any vendor that supports the IBM 3990-3 or basic mode IBM 3990-6 specification can participate as the receiving control unit in an XRC session.

XRC is complex to use and therefore is operationally expensive and resource intensive.

The IBM 3990-6 host also supports a feature that is called *Peer-to-Peer Remote Copy* (*PPRC*). PPRC is host independent and therefore differs from XRC in several ways. First, there is a direct ESCON (Enterprise Systems Connection) fiber link from one IBM 3990-6 host to another IBM 3990-6 host. With this fiber link connection, the primary IBM 3990 host can directly initiate an I/O Input/Output operation to the secondary IBM 3990 host. Secondly, PPRC operates as a synchronous process which means that the MVS (Multiple Virtual Systems) host is not informed of I/O completion of a write operation until both the primary and secondary IBM 3990 host control units have acknowledged that the write has been processed. Although this operation is a cache-to-cache transfer, there is a performance impact which represents a major differentiator of PPRC over XRC. The service time to the user on write operations for PPRC is elongated by the time required to send and acknowledge the I/O to the secondary IBM 3990 host.

The link between the IBM 3990 host controllers utilize standard ESCON fiber but does require an IBM proprietary protocol for this cross controller communication. This proprietary link restricts the use of PPRC to real IBM 3990-6 host controllers only and therefore does not support a multiple vendor environment.

As suggested above, PPRC can also be used as a migration facility. PPRC requires a series of commands to be issued to initiate and control the migration and is therefore resource intensive. IBM has a marketing tool called the PPRC Migration Manager that is used to streamline a migration process with the use of ISPF (Interactive Structured Program Facility) panels and REXX (Restructured Extended Executor) execs.

A migration using PPRC (Release 1) does not support an automatic takeover to the secondary device. In March of 1996, IBM announced an enhancement to PPRC called P/DAS, PPRC Dynamic Address Switch, which apparently when available eliminates the requirement to bring down the applications in order to perform the takeover of the target device. Therefore, P/DAS may allow I/O to be dynamically redirected to the target volume when all source data has been copied to that device.

Use of P/DAS is restricted to IBM 3990-6 controllers and is supported only in an MVS/ESA (Multiple Virtual Systems/Enterprise Systems Architecture) 5.1 and DFSMS/MVS 1.2 environment. Therefore the enhancement offered by P/DAS is achieved at the cost of prerequisite software. Furthermore, the dynamic switch capability is based on the PPRC platform and therefore supports only a IBM 3990-6 environment.

Although PPRC does have some of the requirements for transparent migration, PPRC does not have all of them.

PPRC is transparent to the end user and the application program. No application program changes are required and the facility is dynamically activated.

The data on the source volume is available for read and write access during a PPRC migration.

P/DAS apparently supports a dynamic and nondisruptive takeover of the target volume when the source and target volumes are synchronized.

PPRC ensures complete data integrity because a write operation will not be signaled complete until the primary and the secondary IBM 3990 control units have acknowledged the update request. This methodology will elongate the time required to perform update operations.

PPRC requires a proprietary link between two control units manufactured by the same vendor. For example, only IBM 3990-6 control units can participate in an IBM PPRC migration. Therefore PPRC does NOT support a multiple vendor environment.

PPRC is complex to use and therefore is operationally expensive and resource intensive.

EMC Corporation's remote mirroring facility is called Symmetrix Remote Data Facility (SRDF). The SRDF link is proprietary and therefore can only be used to connect dual Symmetrix 5000 subsystems.

SRDF has two modes of operation. The first is a PPRC-like synchronous mode of operation and the second is a "semi-synchronous" mode of operation. The semi-synchronous mode is meant to address the performance impact of the synchronous process. In the synchronous mode, the host is signaled that the operation is complete only when both the primary and the secondary controllers have acknowledged a successful I/O operation. In the semi-synchronous mode, the host is signaled that the operation is complete when the primary controller has successfully completed the I/O operation. The secondary controller will be sent the update asynchronously by the primary controller. No additional requests will be accepted by the primary controller for this volume until the secondary controller has acknowledged a successful I/O operation. Therefore in the SRDF semi-synchronous mode, there may one outstanding request for each volume pair in the subsystem.

EMC personnel must be involved in all SRDF activities unless the user has installed specialized host software that is supplied by EMC. The proprietary nature of SRDF restricts its use as a data migration facility. The primary function of SRDF is to provide data protection in the event of a disaster.

Late in 1995, EMC announced a migration capability that is based on the SRDF platform. This facility allows a Symmetrix 5000 to directly connect to another vendor's subsystem. The objective of the *Symmetrix Migration Data Service* (*SMDS*) is to ease the implementation of an EMC subsystem and is not meant to be a general purpose facility. SMDS has been called the "data sucker" because it directly reads data off another control unit. The data migration must include all of the volumes on a source subsystem and the target is restricted to a Symmetrix 5000.

An EMC Series 5000 subsystem is configured so that it can emulate the address and control unit type and device types of a existing subsystem (the source). This source subsystem is then disconnected from the host and attached directly to the 5000. The 5000 is then attached to the host processor. This setup is disruptive and therefore does cause an application outage.

The migration begins when a background copy of the source data is initiated by the 5000 subsystem. Applications are enabled and users have read and write access to data. When the target subsystem (the 5000) receives a read request from the host, the data is directly returned if it has already been migrated. If the requested data has not been migrated, the 5000 will immediately retrieve the data from the source device. When the target subsystem receives a write request, the update is placed only on the 5000 and is not reflected onto the source subsystem. This operation means that updates will cause the source and target volumes to be out of synchronization. This operation is a potential data integrity exposure because a catastrophic interruption in the migration process will cause a loss of data for any volume in the source subsystem that has been updated.

Although the Symmetrix Migration Data Service does have some of the requirements for transparent migration, SMDS does not have all of them.

a. SMDS is not transparent to the end user and the application program. Although no application program changes are required, the facility cannot be nondisruptively activated. All applications are deactivated so that the 5000 can be installed and attached to the host in place of the source subsystem. Specialized software is loaded into the Symmetrix 5000 to allow it to emulate the source subsystem and initiate the data migration. This disruption can last as long as an hour.
  1. The data on the source volume is available for read and write access during a SMDS migration.
  2. SMDS may support a dynamic and nondisruptive takeover of the target volume when the source and target volumes are synchronized. At the end of the migration, the source subsystem must be disconnected and the migration software must be disabled and it is unknown whether this is disruptive and an outage is required.
  3. SMDS can link to control units manufactured by other vendors. However, the purpose of SMDS is to ease the disruption and simplify the installation of an EMC 5000 subsystem. Data can only be migrated to an EMC subsystem. Therefore SMDS does NOT support a multiple vendor environment.

SMDS does NOT ensure complete data integrity. During the migration, data is updated on the target subsystem and is not reflected on the source subsystem. A catastrophic error during the migration can cause the loss of all application updates.

The State of the Art in a Summary

The products that are available on the market today do not meet all of the data migration requirements.

The maintenance of continuous data availability is a fundamental mission of data centers. In order to support this goal, the migration facility must be initiated transparent to all applications and provide a means for the nondisruptive takeover of the target device.

The value of data and information is critical to the operation and competitiveness of the enterprise and therefore any exposure to possible data loss is unacceptable.

The control of the costs of the ever expanding storage assets is a large component in financing an information technology infrastructure. A competitive multiple vendor environment provides a mechanism to support effective cost management. Therefore, the migration facility should be vendor independent. Accordingly, there is a need for improved data migration methods and apparatus which have all the data migration requirements.

SUMMARY OF THE INVENTION

The present invention is a data migration facility for managing and maintaining large computer systems and particularly for automatic movement of large amounts of data (migration of data) from one data storage location to another data storage location in the computer system.

The computer system has a plurality of storage volumes for storing data used in the computer system, one or more storage control units for controlling I/O transfers of data in the computer system from and to the storage volumes, one or more application programs for execution in the computer system using data accessed from and to the storage volumes, one or more operating system programs for execution in the computer system for controlling the storage volumes, the storage control units and the application programs, and a data migration program for migrating data from one of the data volumes designated as a source volume to one of said data volumes designated a target volume while the application programs are executing using data accessed from and to the storage volumes.

The data migration program includes a main module to control the start of a migration session when the application programs are using data accessed to and from the source volume, to migrate data from the source volume to the target volume, and to end the migration session whereby the application programs are using data accessed to and from the target volume The data migration program includes a volume module to control the volumes during the migration session. The data migration program includes a copy module to control the copying of data from the source module to the target module during the migration session. The data migration program includes a monitor module for monitoring I/O transfers to the data volumes during the migration sessions.

In one embodiment, the data migration program includes dynamic activation and termination, includes non-disruptive automatic swap processing that does not require operator intervention, is transparent to applications and end-users while providing complete read and write activity to storage volumes during the data migration, permits multiple migrations per session, permits multiple sessions. Additionally, the installation is non-disruptive (a computer program that can execute as a batch process rather than requiring the addition of a new hardware sub-system to the computer system), requires no IPL (Initial Program Load) of the operating system, is vendor independent with any-to-any device migration independent of DASD (Direct Access Storage Device) control unit model type or device type. The data migration program includes a communication data set (COMMDS) located outside the DASD control unit which helps ensure vendor independence.

The data migration facility has complete data integrity at all times, provides the ability to introduce new storage subsystems with minimal disruption of service (install is disruptive), allows parallel or ESCON channel connections to ensure vendor independence and can be implemented as computer software only, without need for dependency on hardware microcode assist.

The foregoing and other objects, features and advantages of the invention will be apparent from the following detailed description in conjunction with the drawings.

BRIEF DESCRIPTION OF THE DRAWINGS

FIG. 3 depicts a single MVS operating system embodiment for migrating data from a source volume to a target volume.

FIG. 4 depicts a multiple MVS operating system embodiment for migrating data from a source volume to a target volume.

DETAILED DESCRIPTION

Figure 1:
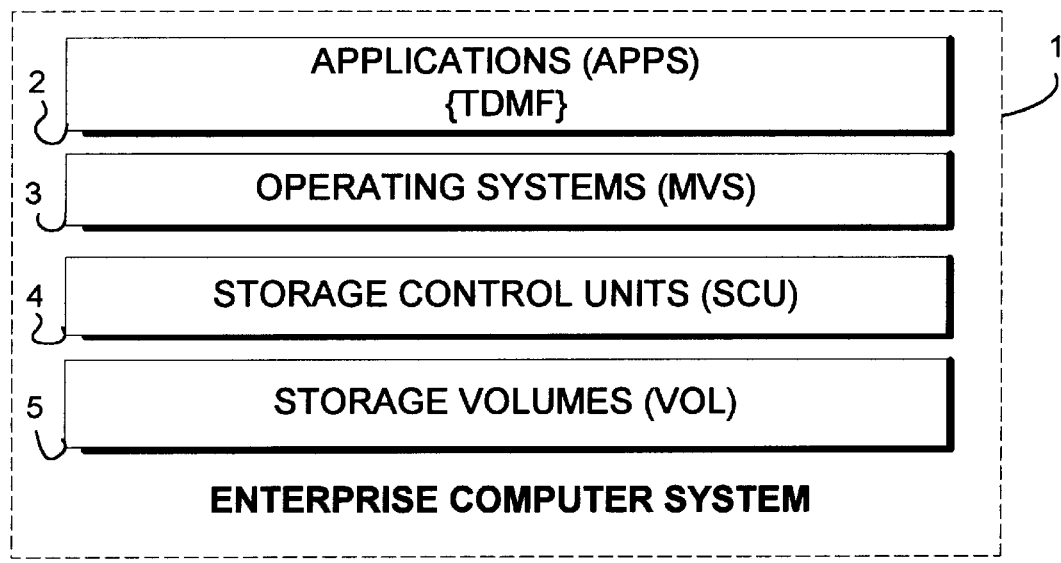
FIG. 1 depicts a block diagram of an enterprise computer system.

Enterprise System—FIG. 1

The Transparent Data Migration Facilities (TDMF) is resident as an application program under the MVS/ESA host operating system of the enterprise system 1 of FIG. 1. The Transparent Data Migration Facilities (TDMF) is an application program among other application programs 2. The TDMF migration provides model independence, operational flexibility, and a completely transparent migration.

In FIG. 1, the enterprise system 1 is a conventional large-scale computer system which includes one or more host computer systems and one or more operating systems such as the MVS operating system. The operating systems control the operation of the host computers and the execution of a number of customer applications 2 and a TDMF application. The TDMS application is used for migrating data from one location in the enterprise system to another location in the enterprise system. The data locations in the enterprise system 1 are located on storage volumes 5. Data is transferred to and from the storage volumes 5 under control of the storage control units 4. The architecture of the FIG. 1 system is well-known as represented, for example, by Amdahl Corporation of Sunnyvale, Calif. (Amdahl) and IBM mainframe systems.

For efficient operation of the enterprise system 1, it is necessary at times to migrate data from one of the storage volumes 5 to another one of the storage volumes 5. The storage volumes 5 between which the migration occurs may be located at the same place under control of a single operating system or may be located in volumes under the control of different operating systems. Also, some of the volumes may be located geographically remote such as in different cities, states or countries. When located remotely, the remote computers are connected by a high-speed data communication line such as a T3 line.

The TDMF migration is intended for flexibility, for example, so that multiple MVS/ESA releases are supported (4.2, 4.3, 5.1, 5.2; OS390 V1.1, V1.2, V1.3, and V2.4), so that shared data system environments are supported, so that CKD/E (Count Key Data/Extended) compatible 388x and 399x control units are supported (Read Track CCW (Channel Control Word) is required in the disclosed embodiment), so that 3380 and 3390 device geometries are supported, so that flexible device pairing options are possible (uses device pairs with equal track sizes and numbers of cylinders and requires the target volume to be equal to or greater than the source volume), so that a single TDMF session can support up to 640 concurrent migrations, so that a single TDMF session can support concurrent migrations with differing control unit and device types, and so that optional point-in-time capability is available.

The TDMF migration is intended to have an ease of use that includes, for example, easy installation, a simple parameter driven process, a centralized control and monitoring capability, and the ability to have integrated online help and documentation.

The TDMF migration is intended to have a minimal impact on performance featuring, for example, a multiple tasking design, efficient user I/O scanning, asynchronous copy and refresh processes, minimization of device logical quiesce time and integrated performance measurement capability.

The TDMF migration is intended to have application transparency including, for example, dynamic installation and termination, no requirement for application changes, continuous read and write access, dynamic enablement of MVS intercepts and dynamic and nondisruptive takeover of target devices.

The TDMF migration is intended to have data integrity including, for example, continuous heartbeat monitoring, dynamic error detection and recovery capability, passive and nondestructive I/O monitoring design, optional data compare capability and maintenance of audit trails.

Figure 2:
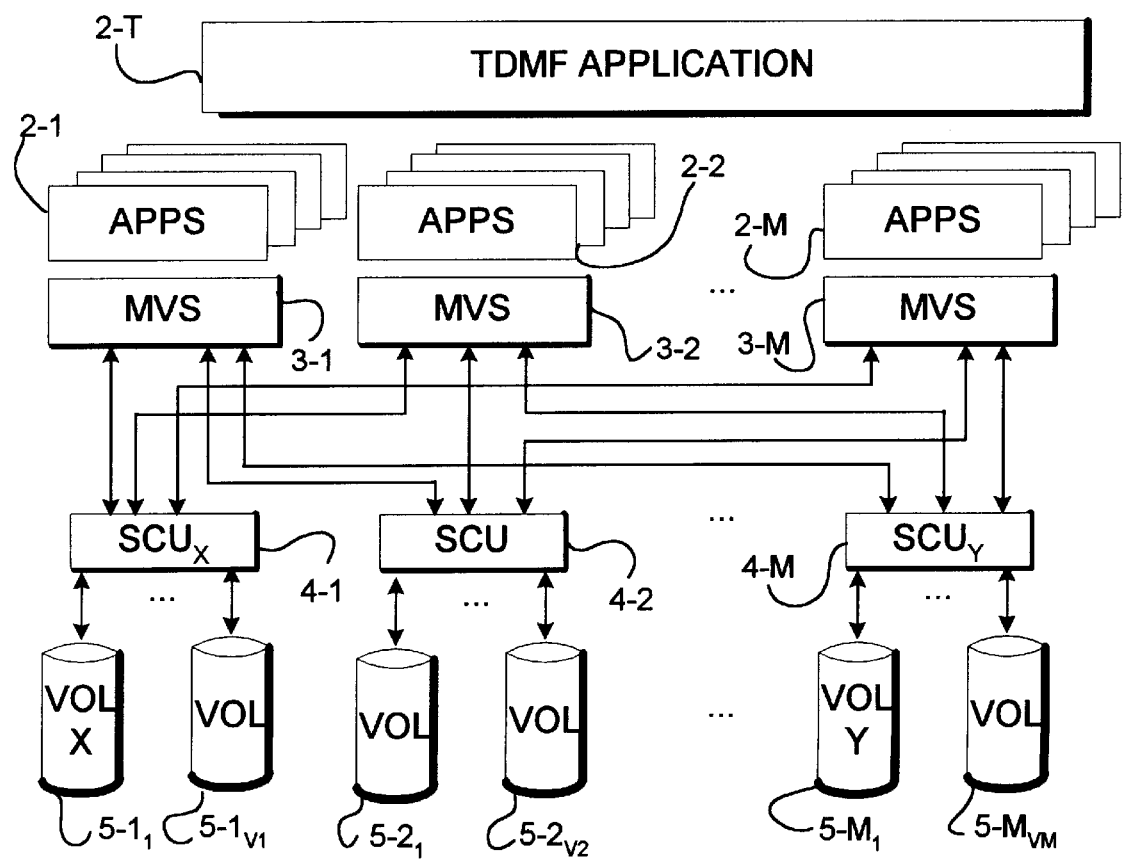
FIG. 2 depicts further details of the enterprise system of FIG. 1.

Multiple Operating System Environment—FIG. 2

In FIG. 2, the multiple operating systems 3 include the MVS operating systems 3-1, 3-2, . . . , 3-M. These operating systems 3 are typically running on a plurality of different host computers with one or more operating systems per host computer. Each of the operating systems 3-1, 3-2, . . . , 3-M is associated with a plurality of application programs including the application programs 2-1, 2-2, ..., 2-M, respectively. The application programs 2-1, 2-2, ..., 2-M are conventional application programs as would be found in a customer enterprise system. In addition to the conventional application programs, the TDMF application program 2-T is also present on each of the operating systems 3-1, 3-2, ..., 3-M that are to be involved in a data migration.

In FIG. 2, each of the operating systems 3-1, 3-2, ..., 3-M is associated with a storage control unit complex 4 including the storage control unit complexes 4-1, 4-2, ..., 4-M, respectively.

Each of the storage control units 4-1, 4-2, ..., 4-M is associated with one or more volumes. In the example shown, the storage control unit 4-1 is associated with the data storage volumes $5-1_1, \ldots, 5-1_{V1}$. Similarly, the storage control unit 4-2 is associated with the volumes $5-2_1, 5-2_{V2}$. Finally, the storage control unit 4-M is associated with the volumes $5-M_1, \ldots, 5-M_{VM}$.

The operation of the FIG. 2 data storage is conventional in the MVS environment. Specifically, any one of the applications 2-1, 2-2, ..., 2-M may store or retrieve data from any one of the volumes 5 under control of the operating systems 3-1, 3-2, ..., 3-M through the storage control units 4-1, 4-2, ..., 4-M.

At any time, any one of the volumes 5 may be designated for replacement or otherwise become unavailable so that the data on the volume must be moved to one of the other volumes of FIG. 2. For example, the data of a source volume X may be migrated to a target volume Y. In FIG. 2, by way of example, volume $5-1_1$ has been designated as the source volume and volume $5-M_1$ has been designated as the target volume. The objective is to move all the data from the source volume X to the target volume Y transparently to the operation of all of the applications 2-1, 2-2, ..., 2-M so that the enterprise system of FIG. 2 continues operating on a continuous 24-hour by seven day data availability without significant disruption.

Single MVS Operating System Environment—FIG. 3

In FIG. 3, the single master MVS operating system 3-1 controls the operation of the applications 2-1 on a source volume $5_X$. At some time, the enterprise system requires that the source volume $5_X$ be taken out of service requiring the data on the source volume $5_X$ to be migrated to a target volume $5_Y$. The operating system 3-1 controls transfers to and from the source volume $5_X$ through the control unit $4_X$. Similarly, the MVS operating system 3-1 controls transfers to and from the target volume $5_Y$ through the storage control unit $4_Y$. The data migration from the source volume $5_X$ to the target volume $5_Y$ is under control of the TDMF application $2-T_1$. In order to achieve the transparent data migration from the source volume $5_X$ to the target volume $5_Y$, an additional data volume 5-1 which is not involved in the data migration is available to the MVS operating system 3-1. During the entire migration from the source volume $5_X$ to the target volume $5_Y$, the applications 2-1 continue their operation without disruption and while maintaining complete data integrity.

Multiple Operating System Environment Example—FIG. 4

In FIG. 4, the MVS operating systems 3-1, 3-2, ..., 3-M are all part of the enterprise system 1 of FIG. 1. Each of the operating systems 3-1, 3-2, ..., 3-M is associated with corresponding application programs 2-1, 2-2, ..., 2-M. Each of the applications 2-1, 2-2, ..., 2-M is operative under the control of the MVS operating systems 3-1, 3-2, ..., 3-M to access the storage volumes 5 through the storage control units 4-1, 4-2, ..., 4-M.

Specifically, the storage control units 4-1, 4-2, ..., 4-M control accesses to and from the volumes 5-1, 5-2, ..., 5-M, respectively. Specifically, the volumes 5-1 include the volumes $5-1_1, \ldots, 5-1_{V1}$, the volumes 5-2 include the volumes $5-2_1, \ldots, 5-2_{V2}, \ldots$, and the volumes 5-M include the volumes $5-M_1, \ldots, 5-M_{VM}$, respectively.

At some point in time it becomes desirable in the enterprise system of FIG. 4 to migrate data from a source volume $VOL_X$ to a target volume $VOL_Y$. In the example of FIG. 4, the source $VOL_X$ is designated as $5-1_1$ controlled through the $SCU_X$ 4-1 and the target volume $VOL_Y$ is designated $5-M_1$ and is controlled through the $SCU_Y$ designated 4-M. The data migration occurs from the source $VOL_X$ to the target $VOL_Y$ without interruption of the customer applications 2-1, 2-2, ..., 2-M.

In order to control the data migration from the source $VOL_X$ to the target $VOL_Y$, the TDMF application 2-T operates in a distributive manner across each of the operating systems 3-1, 3-2, ..., 3-M. Specifically, the operation of the TDMF migration application is in the form of a master/slave implementation. Each of the operating systems 3-1, 3-2, ..., 3-M includes a corresponding instance of the TDMF application, namely, the TDMF application 2-T. One of the applications is designated as a master TDMF application and the other of the applications is designated as a slave TDMF application. In the example of FIG. 4, the TDMF application associated with the MVS 3-1 is designated as the master TDMF application $2-T_{mas}$. Each of the other operating systems 3-2, ..., 3-M is associated with a slave application $2-T_{s11}, \ldots, 2-T_{s1M}$, respectively.

The data migration in the FIG. 3 and FIG. 4 systems is carried out with a TDMF application 2-T (with a separate instance of that application for each MVS operating system) without necessity of any modified hardware connections.

Figure 5:
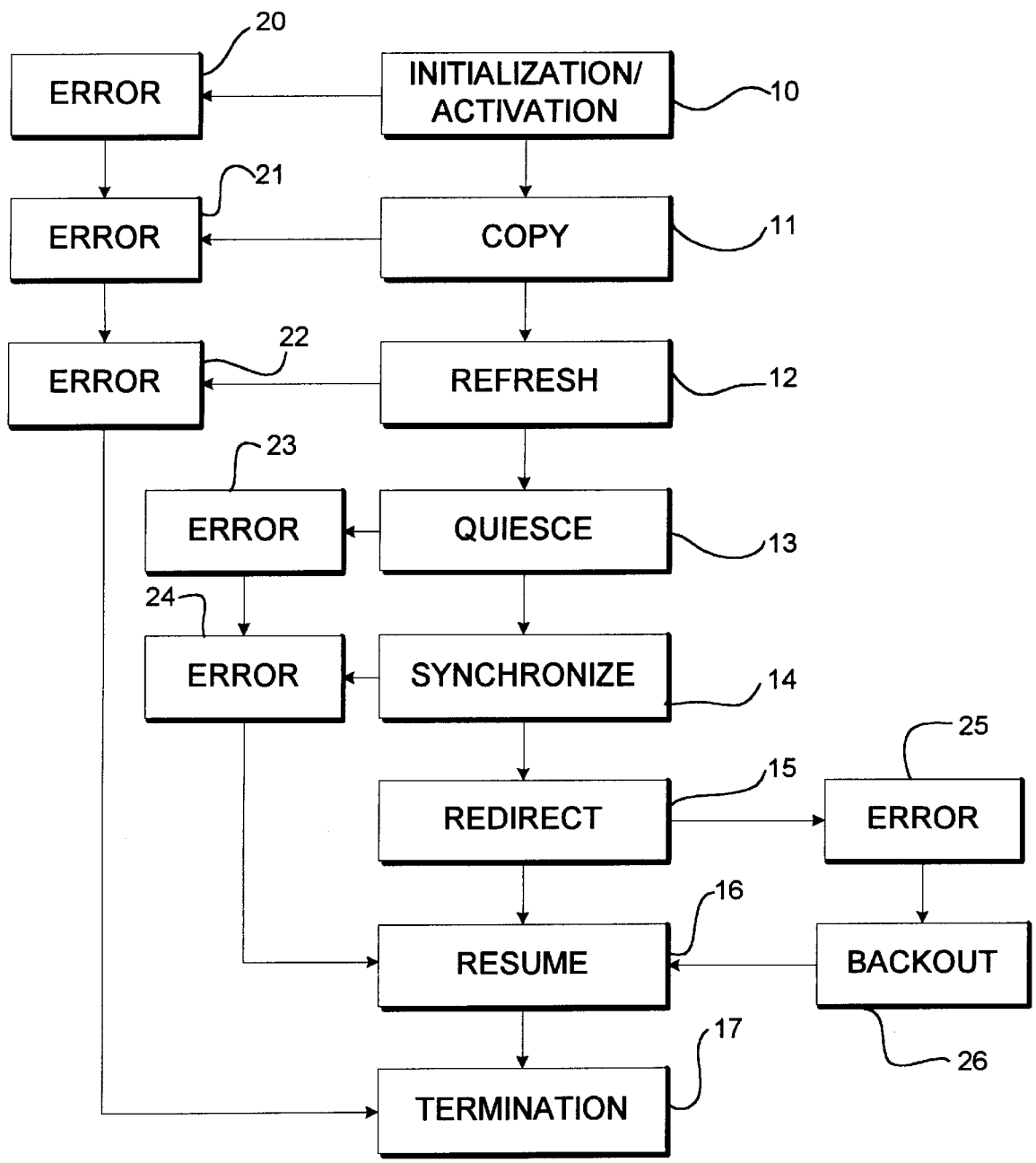
FIG. 5 depicts a flow diagram of the different states of the migration process.

TDMF Migration Stages—FIG. 5

In FIG. 5, the relationship between the migration stages for migrating data between a source volume and a target volume is shown. Specifically, the migration commences with an INITIALIZATION/ACTIVATION phase 10, followed by a COPY phase 11, followed by a REFRESH phase 12, followed by a QUIESCE phase 13, followed by a SYNCHRONIZE phase 14, followed by a REDIRECT phase 15, followed by a RESUME phase 16, and ending in a TERMINATION phase 17. If during the INITIALIZATION/ACTIVATION phase 10, an error occurs, the error is detected by the ERROR module 20 which passes the flow to the TERMINATION stage 17. If an error is detected during the COPY phase 11, the ERROR module 21 passes the flow to the TERMINATION stage 17. If an error is detected during the REFRESH phase 12, the ERROR module 22 passes the flow to the TERMINATION phase 17.

If an error occurs during the QUIESCE phase 13 or the SYNCHRONIZE phase 14, the ERROR modules 23 and 24, respectively, pass the flow to the RESUME phase 16. If an error occurs during the REDIRECT phase 15, the ERROR module 25 passes the flow to the BACKOUT module 26 which then returns the flow to the RESUME phase 16.

The migration phases of FIG. 5 are active in each of the MVS operating systems 3 and the MASTER TDMF application and the MASTER MVS operating system insure that one phase is completed for all operating systems, both master and all slaves, before the next phase is entered.

Figure 6:
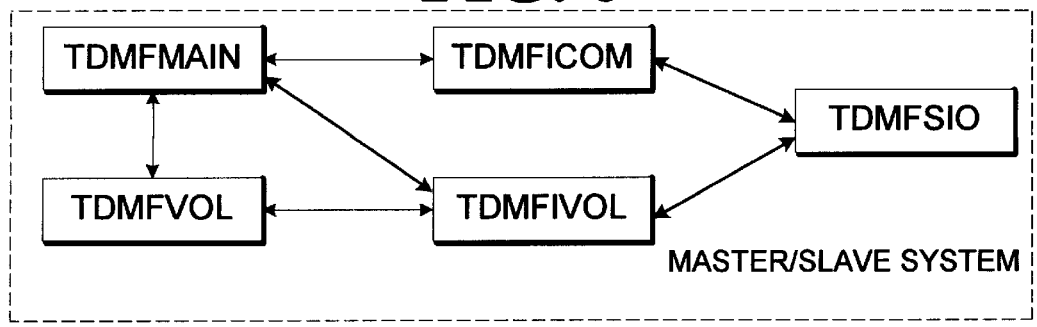
FIG. 6 depicts a block diagram of the different software components that control the master slave operation used to perform the migration process.

MASTER/SLAVE System—FIG. 6

The MASTER/SLAVE system operation is under control of the TDMF application 2-T. That application, and each instance thereof in an MVS operating system includes the modules of FIG. 6. Specifically, the TDMFMAIN module is the main task which calls other ones of the modules for controlling the phasewise execution of the migration as set forth in FIG. 5. The TDMFMAIN module starts the TDMF session of FIG. 5 on the master and slave systems, opens all necessary files, reads and validates control cards and validates all parameters and volumes to be involved in the migration session.

The TDMFVOL module controls the migration process of any and all volumes being migrated within the TDMF session of FIG. 5.

The TDMFICOM generates channel programs to implement I/O operations being requested to the COMMUNICATIONS DATA SET (COMMDS) via parameters passed by the caller. The caller may request that the system initialize the COMMDS or to selectively read or write caller specified TDMF control blocks as required by the controller. The TDMFICOM module is called by the TDMFMAIN module only.

The TDMFIVOL module generates channel programs to implement I/O operations being requested to volumes being migrated to the IDMF session of FIG. 5 via parameters passed by the caller.

The TDMFSIO module issues a request to the MVS INPUT/OUTPUT SUPERVISOR (IOS) component to perform the I/O operation represented by the INPUT/OUTPUT SUPERVISOR control BLOCK (IOSB) in conjunction with its SERVICE REQUEST BLOCK (SRB) as requested by the caller. The IDMFSIO module can be called from the TDMFICOM module and the TDMFIVOL module. Upon completion of the I/O operation requested, control is returned to the calling module.

Figure 7:
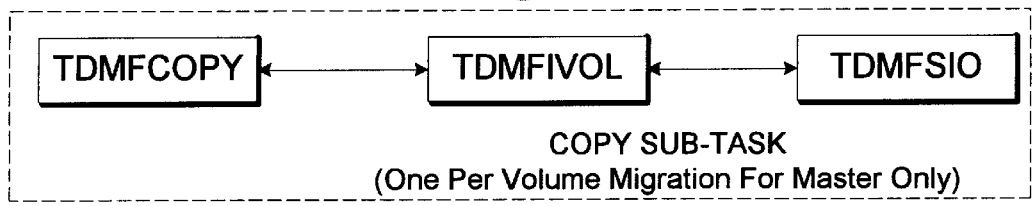
FIG. 7 depicts a block diagram of the copy sub-task components that control the copying of data in the migration process.

COPY Sub-task—FIG. 7

In FIG. 7, the COPY Sub-task functions with one per volume migration for the master only. The COPY Sub-task includes the TDMFCOPY module which provides the functions required by the TDMF COPY Sub-task. The TDMFCOPY Sub-task is attached as a Sub-task by the module TDMFVOL by means of an ATTACHX macro during its processing. The TDMFCOPY module implements three Sub-task phases, namely, the COPY sub-phase, the REFRESH sub-phase, and the SYNCHRONIZATION sub-phase.

The TDMFIVOL module may also be called by the TDMFCOPY module to generate channel programs to implement I/O operation being requested to volumes being migrated to the TDMF session of FIG. 5 via parameters passed by the caller.

The TDMFSIO module when called by the TDMFIVOL module issues a request to the MVS INPUT/OUTPUT SUPERVISOR (IOS) component to perform the I/O operation represented by the INPUT/OUTPUT SUPERVISOR CONTROL BLOCK (IOSB) in conjunction with its SERVICE REQUEST BLOCK (SRB) as requested by the caller. Upon completion of the I/O operation requested, control is returned to the TDMFIVOL module.

Figure 8:
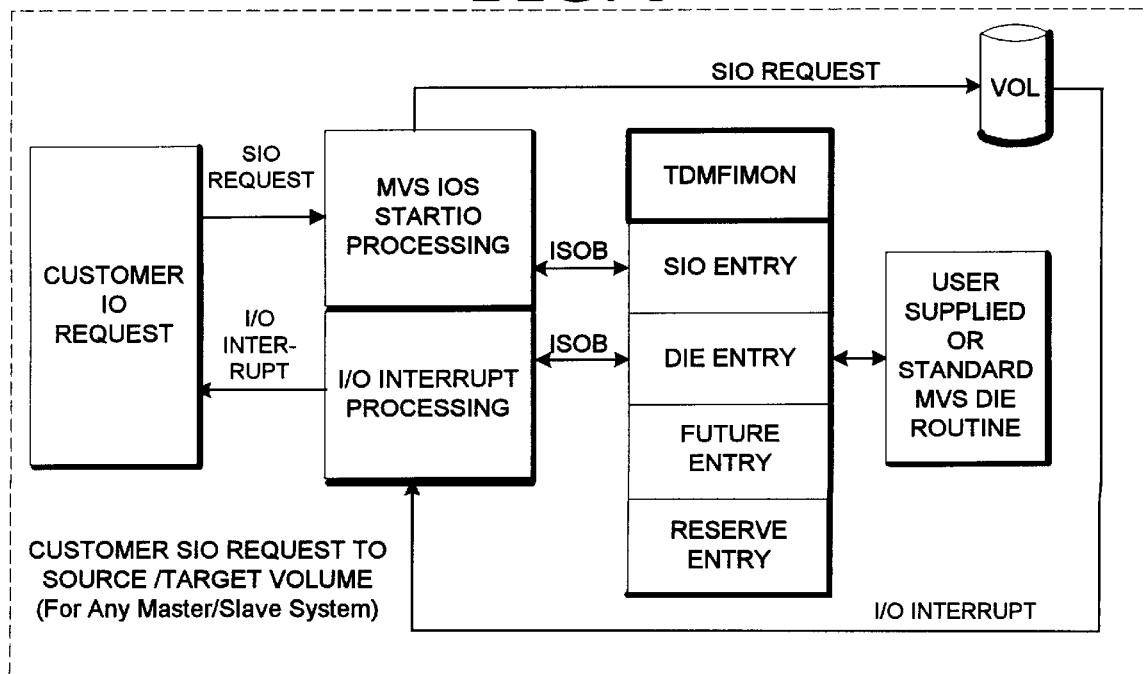
FIG. 8 depicts a block diagram of the customer I/O request components that control the operation of I/O requests during the migration process.

I/O Monitoring—FIG. 8

In FIG. 8, a block diagram of the monitoring of I/O operations during a migration session of FIG. 5 is shown. The FIG. 8 modules are conventional with the addition of the TDMFIMON module. The purpose of the TDMFIMON module is to monitor all customer I/O operations to the source and target volumes during the life of an active migration session of FIG. 5. The TDMFIMON module insures that the primary design objective of insuring data integrity of the target volume by insuring that any update activity by customer I/O operation that changes the data located on the source volume will be reflected on the target volume. The TDMFIMON module only monitors volumes involved in a migration session of FIG. 5 and any I/O operations to volumes not involved in the TDMF migration session are not impacted in any fashion.

Figure 9:
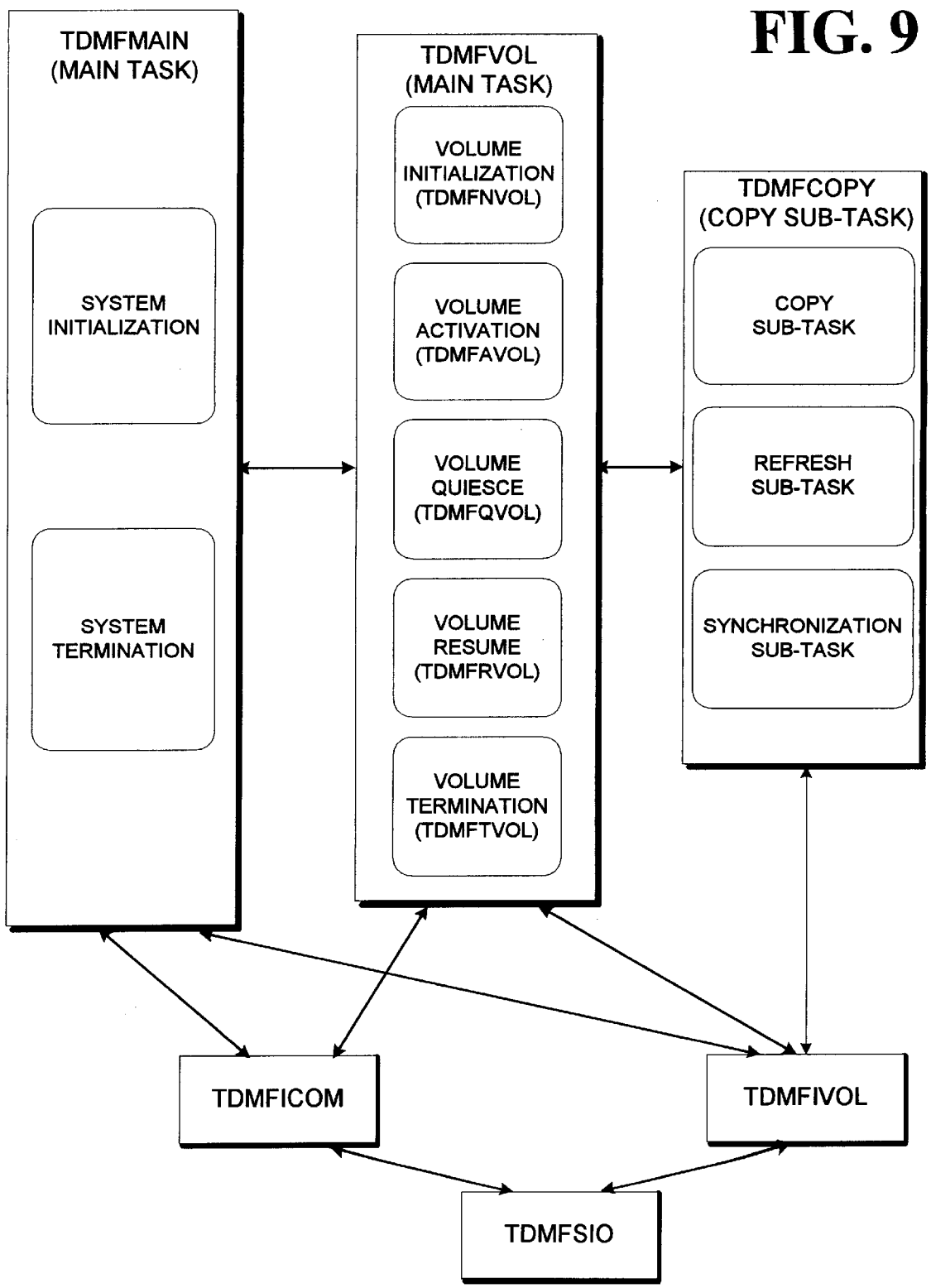
FIG. 9 depicts a block diagram of the interrelationship of the different software components used to perform the migration process.

TDMF Module Overall Architecture—FIG. 9

In FIG. 9, the overall architecture of the computer software for implementing the TDMF migration of FIG. 5 is shown. The TDMFMAIN module functions to control systems initialization and system determination and calls the TDMFVOL module, the TDMFICOM module, and the TDMFIVOL module.

The TDMFVOL module is responsible for volume initialization with the TDMFIVOL module, volume activation with the TDMFAVOL module, volume quiesce with the TDMFQVOL module, volume resume with the TDMFRVOL module and volume termination with the TDMFTVOL module. The TDMFVOL module calls or returns to the TDMFMAIN module, the TDMFICOM module, the TDMFIVOL module, and the TDMFCOPY module.

The TDMFCOPY module is called by and returns to the TDMFVOL module and the TDMFIVOL module.

The TDMFICOM module calls and is returned to the TDMFSIO module.

The TDMFIVOL module calls and is returned to the TDMFSIO module.

Details of the various modules of FIG. 6, FIG. 7, FIG. 8 and FIG. 9 for performing the migration in the phases of FIG. 5 are described in detail in the following LISTING 1 near the end of the specification before the claims.

Figure 10:
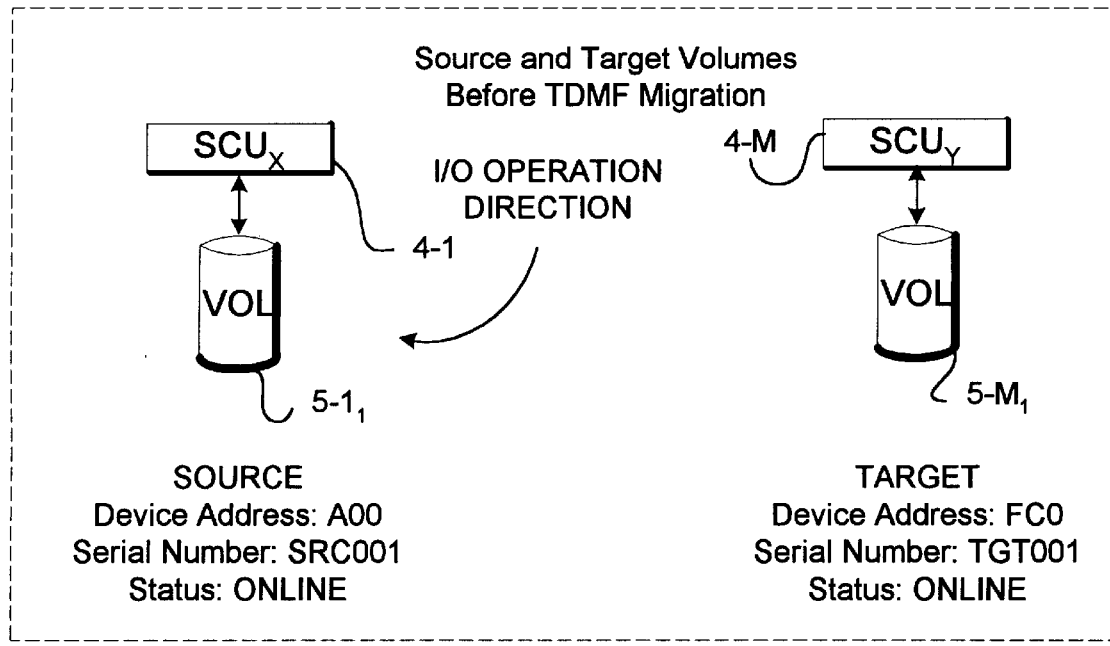
FIG. 10 depicts the source and target volumes before a TDMF migration.

Source and Target Volumes Before TDMF Migration—FIG. 10

In FIG. 10, a data migration is to occur between the volume $5\text{-}1_1$ as the source through the storage control unit $SCU_X$ designated 4-1 to the target volume $5\text{-}M_1$ through the storage control unit $SCU_Y$ designated 4-M. The SOURCE volume has device address A00, serial number SRC001 and is in the ON-LINE status before the TDMF migration. The target volume has the device address FC0, serial number TGT001 and is in the ON-LINE status before volume migration. Before the volume migration begins, all I/O operations are being directed to the source volume $5\text{-}1_1$.

Figure 11:
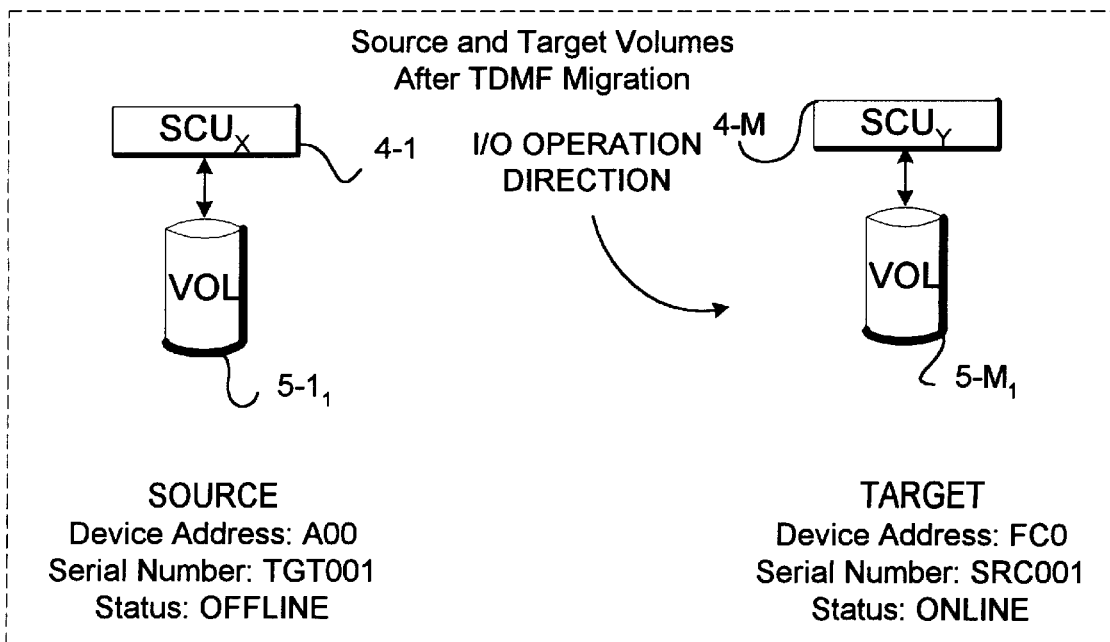
FIG. 11 depicts the source and target volumes after a TDMF migration.

Source and Target Volumes After All TDMF Migration—FIG. 11

In FIG. 11, the source volume $5\text{-}1_1$ has a device address of A00, a serial number of TGT001 and an OFF-LINE status. The target volume $5\text{-}M_1$ has a device address of FC0, a serial number of SRC001, and an ON-LINE status.

TDMF Migration Operation

TDMF is initiated as an MVS batch job. TDMF's job control language identifies the system type, session control parameters, and the communications data set (COMMDS). The session control parameters define the paired source ($VOL_X$) and target ($VOL_Y$) volumes which make up the migrations under the control of this session. The control parameters also define the master system and all slave systems. The COMMDS set is the mechanism that is used to enable all systems to communicate and monitor the health of the migrations in progress. The COMMDS set is also used as an event log and message repository.

All systems that have access to the source volume must have TDMF activated within them. This requirement is critical in order to guarantee data integrity. One system is designated as the master (PARM=MASTER) and all other systems are designated as slaves (PARM=SLAVE).

The responsibilities of the master system include:

Initialization of the master TDMF environment and the COMMDS.

Validation of the initialization of all slave systems.

The control of all migrations defined in this TDMF session.

The monitoring of source volume user I/O activity in order to detect updates.

The copying of data from the source to the target volume.

Collection of update information from all systems.

The refresh and synchronization of the target volume due to detected update activity.

The monitoring of the internal health of the master environment and the health of all slave systems.

The responsibilities of the slave systems include:

Initialization of the slave TDMF environment.

Establishment of communication to the master through the COMMDS.

The processing and acknowledgment of all migration requests as received from the master.

The monitoring of source volume user I/O activity in order to detect updates.

Transmission of update information to the master through the COMMDS.

The monitoring of the internal health of this slave environment and the health of all other systems.

The master system initiates and controls all migrations. A migration is broken into the major phases as illustrated in FIG. 5. The master initiates each phase and all slave systems must acknowledge in order to proceed. If any system is unable to acknowledge or an error is detected, the systems will cleanup and terminate the migration. To ensure data integrity, TDMF is designed with a passive monitoring capability so that all user I/O operations to the source volume will complete as instructed by the application. This completion means that if any unexpected event occurs, the data on the source volume is whole. TDMF will merely cleanup and terminate the migration.

Standard cleanup and recovery is active for all phases with the exception of the REDIRECT phase. During this REDIRECT phase, it may be necessary to take additional recovery actions. This specialized recovery is called the BACKOUT phase. Backout is required due to error detection in a multiple system environment. In a multiple system migration, the systems may be at differing stages within the REDIRECT phase at the point the error is detected. Some of the systems may have completed redirect and others may have not completed redirect processing. Backout recovery dynamically determines the state of each system in order to take the appropriate recovery action. However, even in the REDIRECT and BACKOUT phases, the data on the source volume is whole and user data will not be lost.

Referring again to FIG. 5, a TDMF session begins with an INITIALIZATION phase, immediately followed by an ACTIVATION phase. During this phase, all systems confirm the validity of the source and target volumes and enable user I/O activity monitoring. When all systems acknowledge successful completion of this process, the master will begin the COPY phase and initiate a sub-task (COPY Sub-task) to copy data from the source to the target volume. This COPY Sub-task is a background activity and will copy data asynchronously from the source volume to the target volume. There is an independent COPY sub-task for each active migration.

I/O monitoring provided by the TDMFIMON module of FIG. 8 provides the ability to detect updates to the source volume. A system that detects a source volume update will note this update in a refresh notification record and send this information to the master system.

When a COPY sub-task has completed one pass of the source volume, the REFRESH phase is initiated by the master. During this phase, the updates that have been made to the source volume are reflected onto the target volume. The REFRESH phase is divided into multiple cycles. A refresh cycle is a pass through the entire source volume processing all updates. TDMF measures the time required to process the refresh operations in a single refresh cycle. The refresh cycles will continue until the time for a refresh cycle is reduced that allows the Synchronization Goal to be achieved to a threshold that is based on the collected performance data. When the threshold is reached, this event signals the master to be ready to enter the Quiesce and Synchronization phases. If there are multiple REFRESH phases during a migration, it is due to the inability of TDMF to meet the SYNCHRONIZATION goal. This is usually because of high write activity on the Source volume. If there are no issues with this, then there is no reason to change the SYNCHRONIZATION goal parameter.

Prior to the Synchronization phase, a QUIESCE is issued to the Source volume. In the instance of a multi-system migration, the Master issues a request to the Slave(s) to Quiesce all I/O to the Source volume (from the slave side). At this time the final group of detected updates are collected and applied to the Target volume (SYNCHRONIZATION). At the end of Synchronization, the Master starts the volume REDIRECT (swap) phase. The Target volume has now become the new Source volume. When all systems have verified the Redirect, the Master initiates the RESUME phase so that user I/O can continue to the new source volume. The elapsed time between the last QUIESCE phase and the RESUME phase is approximately four (4) seconds plus the ACTUAL SYNCHRONIZATION time (which should always be less than the specified synchronization goal).

The Synchronization Goal default is five (5) seconds. Synchronization will not occur unless the calculated synchronization time is less than the goal. If the synchronization goal is increased, then the time the user I/O is queued (quiesced) is greater. If the value 999 is used, this equates to synchronize as soon as possible; it does not matter how long it takes. This can be a significant amount of time depending on the write activity of the source volume. Therefore, use discretion when changing this value.

Application I/O operations during the Copy and Refresh phases are impacted no more than if a backup utility is backing up the source volume at the same time as the application is executing. The Synchronization goal parameter may be specified for each volume migration, allowing the customer to specify the amount of time (in seconds) that he will allow the Synchronization phase to execute. This is the maximum amount of time.

Performance Impact by Phase

The Master and Slave(s) wake up for processing based upon a variable which is the minimum number of seconds based upon any migration volume's current phase or stage. The phases of a volume migration and their associated time intervals are:

| Phase | Time Interval |
|---|---|
| Copy | 30 seconds |
| Refresh pass #1 | 15 seconds |
| Refresh pass #2 | 10 seconds |
| Refresh pass #3 . . . n | 5 seconds |
| Quiesce | 1 second |
| Synchronize | 1 second |
| (Compare) | 1 second |
| Swap/Point-in-Time | 1 second |
| Resume | 1 second |
| Termination/Completion | 15 seconds |

This allows TDMF to be responsive with a minimum of CPU overhead.

The CPU overhead associated with running IDMF is less than 3 percent on average for the Master system. This is dependent upon the number of storage volumes within a session and write activity against those source volumes. A Slave system's CPU overhead will be almost non-measurable.

For example, if the Master job takes 44 minutes, 22 seconds (2662 seconds total) to migrate 16 volumes, and the TCB time is 63.5 seconds, and the SRB time is 2.92 seconds, then the CPU overhead is equal to 2.49 percent ((63.5+2.92)/2662) for that session.

When a multi-volume migration is running in a TDMF session, not all volumes are going to be in the same phase at the same time. This is because different volumes may have different activity against them. The number of channels available to each Control Unit (CU) will also be a factor in this. Therefore, it is entirely possible to have a 4 volume migration running with volume 1 in the copy phase, volume 2 in a 4th refresh phase, volume 3 completed, and volume 4 is in the Synchronization phase.

Placement of the Master

The Master should be placed on the system that has the most updates or on the system where the owning application is executing. If multiple TDMF Master sessions are being run on multiple operating systems, then the MVS system(s) must have a global facility like GRS or MIM. This is to prevent inadvertent usage of the same volumes in a multi-session environment. If a GRS type facility is not available in the complex, then all Master sessions must run on the same operating system.

Placement of the Communications Dataset

The Communications Dataset (COMMDS) should be placed on a volume with low activity and the volume must not be involved in any migration pairing.

Sample Performance Statistics

In the following tables, time is designated in hours (H), minutes (MM), and seconds (SS.ss) and in the form H:MM:SS.ss; for example, 1:07:20.36 is 1 hour, 7 minutes and 20.36 seconds.

| Description | H:MM:SS.ss | Description | H:MM:SS.ss | % |
|---|---|---|---|---|
| 3380-D No load situation with Compare option on: Single Volume | | | | |
| Copy Time | 11:31.02 | TCB time | 17.93 | |
| Compare Time | 8:11.39 | SRB time | 0.33 | |
| Total Time | 20:11.70 | CPU overhead | | 1.5 |
| 3380-K No load situation: Single Volume | | | | |
| Copy Time | | TCB time | 3.98 | |
| Compare Time | | SRB time | 0.26 | |
| Total Time | 34:50.65 | CPU overhead | | 0.2 |
| 3390-3 with a heavy write load: Single volume | | | | |
| Copy Time | 24:11.05 | TCB time | 9.04 | |
| Refresh Time | 16:35.23 | SRB time | 0.72 | |
| Sync Time | 6:29.29 | | | |
| Total Time | 48:25.97 | CPU overhead | | 0.3 |
| 3390-3 No load situation: 8 volume copy | | | | |
| Copy Time | | TCB time | 30.91 | |
| Compare Time | | SRB time | 1.67 | |
| Total Time | 20:24.87 | CPU overhead | | 2.6 |
| 3390-3 No load situation: 16 volume copy | | | | |
| Copy Time | | TCB time | 1:04.13 | |
| Compare Time | | SRB time | 3.20 | |
| Total Time | 33:52.52 | CPU overhead | | 3.3 |
| 3390-3 No load situation: 32 volume copy | | | | |
| Copy Time | | TCB time | 2:13.00 | |
| Compare Time | | SRB time | 5.89 | |
| Total Time | 1:07:20.36 | CPU overhead | | 3.4 |
| 3390-9 No load situation: Single volume | | | | |
| Copy Time | 1:02:36.67 | TCB time | 12.54 | |
| Compare Time | | SRB time | 0.70 | |
| Total Time | 1:03:23.55 | CPU overhead | | 0.3 |

Master System Responsibilities

Initializing the master TDMF environment and the COMMDS.

Starting and controlling the migrations for all TDMF systems.

Monitoring source volume user I/O activity to detect updates.

Copying data from the source to the target volume.

Processing detected updates from all systems.

Performing refresh operations to the target volume to reflect update activity.

Checking the internal health of the master environment and the health of all slave systems.

Slave System Responsibilities

Initializing the slave TDMF environment and establishing communications to the master, using the COMMDS.

Acknowledging and processing migration requests from the master.

Monitoring source volume user I/O activity and detecting updates.

Notifying the master of update activity through the COMMDS.

Checking the internal health of the slave environment and the health of all systems.

At this time, the master issues the quiesce request to all systems so that activity to the source volume will be inhibited. When the quiesce request is received by a slave system, this is the indication for the slave system to enter the QUIESCE phase and to quiesce and send to the master the final group of detected updates so that the master may perform the synchronization process or optionally S restart an additional REFRESH phase.

When all systems have successfully acknowledged the quiesce request, synchronization will begin in the SYNCHRONIZATION phase. The device quiesce is transparent to all applications. An application can issue I/O requests; however, they will not be executed and will be queued until the RESUME phase. The purpose of the collection of performance information during the REFRESH phase is to minimize the device quiesce time. At the conclusion of the SYNCHRONIZATION phase, the master will initiate the REDIRECT phase.

The purpose of the REDIRECT phase is to cause I/O activity to be redirected to the target volume so that it can become the primary device. The master will request that all systems perform and confirm a successful redirect before the redirect operation is performed by the Master system. When all systems have acknowledged this activity, the master will then initiate the RESUME phase request so that any queued user I/O will begin execution. Subsequent I/O operations will then be directed to the target device.

After all systems have processed the resume request, I/O monitoring will be disabled and the migration will terminate in the TERMINATE phase.

The TDMF facility simplifies the relocation of user-specified data from existing hardware to new storage subsystems, for example, without loss of access to data, without the imposition of unfamiliar operator procedures, and without dependence upon vendor firmware or hardware release levels.

TDMF is transparent to the end user and the application program. No application program changes are required and the facility is dynamically activated.

TDMF provides for full data access during the data migration. The data on the source volume is available to the end user for read and write access.

TDMF supports a dynamic and nondisruptive takeover of the target volume when the source and target volumes are synchronized. All applications with data resident on the source volume may remain enabled during the takeover process.

TDMF ensures complete data in integrity through the use of passive I/O monitoring and background copy operations.

TDMF is an "open" facility and therefore supports a multiple vendor environment. Any vendor that supports the IBM 3880 or IBM 3990 ECKD specification can participate as the sending or receiving control unit in a TDMF migration. (Read Track CCW support is required).

TDMF operates in both a single CPU and/or multiple CPU environment with shared DASD.

With TDMF, the implementation of new storage subsystem technologies can be accomplished in a nondisruptive manner.

With TDMF, the value of existing storage equipment is protected because all devices can participate in a migration session.

With TDMF, a competitive multiple vendor environment is enhanced because TDMF is designed to be independent of any specific storage subsystem.

LISTING 1

TDMF LOGIC © 1998 AMDAHL CORPORATION

INDEX

Module: TDMFMAIN . . . . . . . . . . . . . . . . . . . . . . . . . . . . . . . . . . . . . . . . . . . . . . . . . . . 31

Module: TDMFVOL . . . . . . . . . . . . . . . . . . . . . . . . . . . . . . . . . . . . . . . . . . . . . . . . . . . 36

Module: TDMFIMON . . . . . . . . . . . . . . . . . . . . . . . . . . . . . . . . . . . . . . . . . . . . . . . . . 54

Module: TDMFCOPY . . . . . . . . . . . . . . . . . . . . . . . . . . . . . . . . . . . . . . . . . . . . . . . . . 58

Module: TDMFICOM . . . . . . . . . . . . . . . . . . . . . . . . . . . . . . . . . . . . . . . . . . . . . . . . . 60

Module: TDMFIVOL . . . . . . . . . . . . . . . . . . . . . . . . . . . . . . . . . . . . . . . . . . . . . . . . . . 63

Module: TDMFSIO . . . . . . . . . . . . . . . . . . . . . . . . . . . . . . . . . . . . . . . . . . . . . . . . . . . 66

Module: TDMFSECR . . . . . . . . . . . . . . . . . . . . . . . . . . . . . . . . . . . . . . . . . . . . . . . . . 68

Module: TDMFAUTH . . . . . . . . . . . . . . . . . . . . . . . . . . . . . . . . . . . . . . . . . . . . . . . . . 68

LISTING 1

TDMF LOGIC © 1998 AMDAHL CORPORATION 1
2 MODULE: TDMFMAIN
3 The purpose of this module is to start the TDMF session on a Master or Slave system, open all necessary files, read
4 and validate control cards, validate all parameters and volumes to be involved in the migration session. Initialize all
5 TDMF control blocks and obtain the necessary storage for these control blocks. In the case of a TDMF Master system,
6 the Communications Data Set (COMMDS) will be initialized to it's proper format and all parameters concerning the
7 TDMF session recorded in the COMMDS. In the case of a Slave system, the parameter information concerning the
8 TDMF session will be read from the COMMDS. This module executes in Supervisor State, Protect Key Zero and is
9 the first part of the main task for an address space.
10 This module contains a MVS Extended Set Task Abend Exit (ESTAE) recovery routine. This routine ensures that the
11 TDMFMAIN task receives control in the event that the TDMF main task attempts an abend condition.
12
13 CSECT: TDMFMAIN
14 Set up TDMF areas to include save areas, termination routines, message table, patch table, work areas and
15 clock.
16 Set up recovery environment to include input and output areas, file processing, and initiation/termination.
17 Obtain the SMFid of the executing system.
18 Messages regarding volume processing are queued via routine ADD_MESSAGE for inclusion upon return
19 to TDMFMAIN. Messages regarding system processing are queued via routine ADD_SYSTEM_MESSAGE
20 for inclusion upon return to TDMFMAIN.
21 Call TDMFINIT.
22 Start basic system. Determine if Master or Slave system. Obtain sufficient memory based on type of system.
23 Call TDMFMSTR.
24 Check the SMFID of the executing system, if a Master system.
25 Call TDMFCOM1.
26 Call TDMFCOM2.
27 Call TDMFSLAV.
28 Call TDMFVUCB.
29 Call TDMFINSE.
30 Call TDMFADDT.
31 Initialize message area.
32 If this is a Master system, Enqueue Exclusive, with a SCOPE=SYSTEMS, for all volumes in this migration
33 session and pin the UCBs. This is done to prevent, in a multiple TDMF session environment, the attempt
34 by a customer to migrate volumes involved in one TDMF session at the same time as another TDMF session
35 is attempting to use the same volumes. If the customers Global Resource Serialization (GRS) mechanism does
36 not provide support for multiple systems, the customer is required to execute all Master TDMF systems upon
37 the same CPU complex. If this is the Master system, issue a call to module TDMFICOM requesting

LISTING 1

TDMF LOGIC © 1998 AMDAHL CORPORATION

| | |
|---|---|
| 1 | initialization of the COMMDS. If this is a Slave system, issue a call to module TDMFICOM to update system |
| 2 | record zero. |
| 3 | Call module TDMFICOM requesting that all TDMF main system records to be written for this system. This |
| 4 | includes the main TDMF control block, the TDMFTSOM control block, and information related to the TDMF |
| 5 | authorization routine. This is done to provide diagnostic information that may be necessary at a later time. |
| 6 | Call module TDMFVOL. |
| 7 | This module will call module TDMFVOL, CSECT TDMFVOL, to complete all volume migration phases. |
| 8 | Cancel the current ESTAEX recovery environment. |
| 9 | Go to CSECT TDMFTERM. |
| 10 | ADD_SYSTEM_MESSAGE: |
| 11 | Add designated system message to queue of TDMF system messages located at the end of the main TDMF |
| 12 | control block (TDMF). |
| 13 | ADD_MESSAGE: |
| 14 | Add designated volume message to queue of volume messages located in the TDMF volume message control |
| 15 | block (TDMFVMSG). |
| 16 | |
| 17 | CSECT: TDMFINIT |
| 18 | If this is a Master system, set up the TDMF TSO Monitor (TDMFTSOM) control block and its embedded |
| 19 | TDMF Monitor message (TDMFMMSG) area. Dynamically load the TDMF authorization module |
| 20 | (TDMFAUTH) in to extended private. |
| 21 | Determine and set level of Operating System. Mark TDMF as non-swappable, non-dispatchable, privileged, |
| 22 | and exempt from load balancing within the operating system. |
| 23 | |
| 24 | CSECT: TDMFMSTR |
| 25 | Check input records to determine validity, number of systems, number of volumes to migrate, and any |
| 26 | customer selectable options. Save DCB from here for later use in TDMFCOM1 in order to limit the number |
| 27 | of DCBs used. |
| 28 | |
| 29 | CSECT: TDMFCOM1 |
| 30 | Reuse DCB from TDMFINIT SYSIN processing to process COMMDS by resetting the pointer to SYSCOM. |
| 31 | Verify that SYSCOM data set name and volume serial number is correct. Validate Format 1 DSCB and |
| 32 | CCHHR in order to verify that COMMDS has contiguous cylinders allocated and that the allocation is large |
| 33 | enough. |
| 34 | Obtain UCB via the volume serial number and PIN the device in order to avoid deletion of the UCB via |
| 35 | Dynamic Reconfiguration Manager (DRM). |
| 36 | |

LISTING 1

TDMF LOGIC  © 1998 AMDAHL CORPORATION

| | |
|---|---|
| 1 | CSECT: TDMFCOM2 |
| 2 | Verify that COMMDS is not allocated on volume that is involved in a migration (Master only). |
| 3 | Initialize SRB/IOSB, CCW/IDAL, and COMM data areas. Obtain storage for COMM I/O and page fix it. |
| 4 | Load I/O Monitor (TDMFIMON) into fixed CSA. |
| 5 | Load I/O code (TDMFSIO) into extended private. |
| 6 | Load volume code (TDMFVOL) into extended private. |
| 7 | Load volume I/O code (TDMFIVOL) into extended private. |
| 8 | Load communications I/O code (TDMFICOM) into extended private. |
| 9 | Load copy code (TDMFCOPY) into extended private. |
| 10 | |
| 11 | CSECT: TDMFSLAV |
| 12-14 | If this is a Slave system, obtain system record zero from COMMDS via a call to module TDMFICOM requesting a read of system record zero information. This provides all parameter information for the TDMF session for use by the Slave system, that has previously been initialized by the Master system. |
| 15-17 | If this is a Slave system, verify Slave SMFid in system record zero in order to determine relative system number. Compare Slave SMF SMCA to SMFid in system record zero. Determine if COMMDS has been used previously by this Slave system. |
| 18 | Determine if Slave has been submitted on same system as Master. |
| 19 | Initialize system message area (TDMFSMSG) and save SMFid and relative system number for Slave(s). |
| 20-21 | Calculate number of systems involved with migration session and volumes that were identified by Master. Verify that number of volumes does not exceed maximum allowed. |
| 22 | Initialize volume serial numbers in TDMF control block for UCB_LOOKUP processing. |
| 23 | Issue exclusive ENQueue on COMMDS/volser to ensure data integrity. |
| 24 | |
| 25 | CSECT: TDMFVUCB |
| 26-28 | Validate all source and target volumes in migration session. Verify that all UCBs exist for source and target volumes. Verify that UCBs do NOT exist for new volume serial numbers. Save UCB address information for PIN processing. |
| 29-30 | Verify that source devices exist via the UCB, that they are online, not under-going a change in status (offline), and no page data sets exist on the volume(s). |
| 31-33 | Verify that target devices exist via the UCB, that they are online, not under-going a change in status (offline), and nothing is allocated to the volume(s). The system will allow target devices to be non-existent (or offline) on a Slave system only, if the type of volume migration being requested is for a Point-In-Time migration. |
| 34 | Save all migration session user specified options. |

LISTING 1

TDMF LOGIC © 1998 AMDAHL CORPORATION

| | |
|---|---|
| 1 | If this is a Slave system, set up the TDMF TSO Monitor (TDMFTSOM) control block and its embedded |
| 2 | TDMF Monitor message (TDMFMMSG) area. |
| 3 | In order to allow the design of the quiesce mechanism of volume I/O operations that may be issued while the |
| 4 | volume is quiesced, the TDMF design requires that the IOSLEVEL used by the operating system for Dynamic |
| 5 | Device Reconfiguration (DDR) be saved for subsequent use by TDMFIVOL. |
| 6 | Obtain storage subsystem information of source and target volumes so that re-chaining and update of the |
| 7 | control blocks for those devices that have been swapped can be performed. Areas saved are SSSCB, |
| 8 | SSCBDH, SSCBDV and SSCB device entries. |
| 9 | Verify that COMMDS is allocated behind a control unit that supports ECKD CCWs. Determine device type |
| 10 | and that the COMMDS is on the SAME physical device from the Master and Slave perspectives. The |
| 11 | information necessary to provide the above checks is retrieved by issuing various calls to module TDMFIVOL, |
| 12 | requesting miscellaneous I/O operations to be performed against the volume that contains the COMMDS. |
| 13 | |
| 14 | CSECT: TDMFINSE |
| 15 | Initialize system entries for Master and Slave(s) (if present), TOD value, TDMF ASID, and "dead" intervals. |
| 16 | Set system entries in COMMDS so that initialization will complete or disallow re-use of the COMMDS |
| 17 | without Master re-initialization. |
| 18 | Allocate a special set of TDMFVRNQ control blocks to be used as an input area, when the Master system |
| 19 | reads, as a part of its normal processing in module TDMFVOL, CSECT TDMFCVOL, all TDMFVRNQ |
| 20 | control blocks from all Slave systems. |
| 21 | |
| 22 | CSECT: TDMFADDT |
| 23 | Obtain storage for TDMFWORK and its embedded TDMFDDTE control blocks. |
| 24 | Verify that the volume serial number matches the information in the UCB, via calling module TDMFIVOL, |
| 25 | requesting the miscellaneous read volume label operation. Additional I/O operations are issued to collect |
| 26 | information from the volumes involved in the migration session via subsequent calls to module TDMFIVOL. |
| 27 | Among the I/O operations requested, are the miscellaneous requests to Read Device Characteristics, Sense |
| 28 | ID, Sense Subsystem Status. Then the volumes are checked to ensure that the volumes are not involved in |
| 29 | a duplexing operation, volumes support ECKD CCWs, device type is supported, track geometries are equal, |
| 30 | target device size is equal to or greater than the source device. |
| 31 | Initialize various fields (TDMFMSV, TDMFMSVE, TDMFDDTE) and initialize request from Master to |
| 32 | Slave(s). |
| 33 | Obtain and initialize work areas (SRB/IOSB, CCW/IDAL, Copy Cylinder I/O area, Copy Track I/O area, |
| 34 | Event Notification Facility (ENF) work area; TDMFVMSG, TDMFVRNQ and TDMFVRBM control blocks), |
| 35 | volume options (swap\|point-in-time, automatic\|prompt, single group, purge, and compare), and DDTE entries |
| 36 | for source and target volumes. |
| 37 | Determine DASD subsystem capabilities (caching, Cache Fast Write (CFW), DASD Fast Write (DFW)) and |
| 38 | if they are active or inactive on the subsystem and/or volume. |
| 39 | |

LISTING 1

TDMF LOGIC © 1998 AMDAHL CORPORATION

1 CSECT: TDMFTERM

2    Set up recovery environment via an ESTAEX macro as previously documented. In the case of an abnormal
3    termination, determine who requested the termination (Master/Slave), what module detected the error
4    (TDMFIMON, TDMFSIO, etc.), and if recovery via the TDMF main task is possible or to be passed to MVS.
5    Detach all copy tasks if Master system.

6    Before termination of this system, if a reserve is still held upon the COMMDS, call module TDMFICOM,
7    requesting a write/update of system record zero information, followed by a release of the COMMDS.

8    Call TDMFICOM requesting the write of the TMFVMSG control block for all volumes from this system. If
9    this is a Master system, Dequeue Exclusive for all volumes in this migration session and unpin the UCBs.

10   Collect and print all TDMF TSO Monitor messages (TDMFMMSG), system messages (TDMFSMSG), and
11   all migration messages (TDMFVMSG) for all volumes. If this is a Master system, collect and print all TDMF
12   TSO Monitor messages (TDMFMMSG), system messages (TDMFSMSG), and all migration messages
13   (TDMFVMSG) for all volumes that were issued on behalf of any Slave system that have been previously
14   written to the COMMDS. This Slave system information is collected via calls to TDMFICOM collecting the
15   appropriate control blocks from the COMMDS.

16   Release and free all storage areas obtained.

17   Remove all TDMF modules from memory (TDMFIMON, TDMFCOPY, TDMFVOL, TDMFICOM,
18   TDMFIVOL, TDMFSIO, TDMFAUTH). Dequeue Exclusive Enqueue for the COMMDS volume and unpin
19   the UCB.

20   Cancel ESTAEX recovery environment and return control to MVS.

21

22 CSECT: TDMFMSG

23   A repository of all messages for TDMF as well as un-assigned messages.

24

25 CSECT: TDMFPTCH

26   A patch area used for fixes.

27

LISTING 1

TDMF LOGIC © 1998 AMDAHL CORPORATION

1 MODULE: TDMFVOL

2 The purpose of this module is to control the migration process of any and all volumes being migrated within
3 the TDMF session. It is called from module TDMFMAIN, CSECT TDMFMAIN, after the initialization of
4 the COMMDS on a Master system or upon completion of all error checking on a Slave system. This module
5 executes as a part of the main task for an address space and executes in Supervisor State, Protect Key Zero.

6 This module contains a MVS Extended Set Task Abend Exit (ESTAE) recovery routine. This routine ensures
7 that the TDMFVOL task receives control in the event that the TDMFVOL task attempts an abend condition.

8

9 CSECT: TDMFVOL

10 Create maximum wait of 15 minutes for initialization of slave system(s).

11 Call MS_ADDRESSABILITY.

12 Messages regarding volume processing are queued via routine ADD_MESSAGE for inclusion upon return
13 to TDMFMAIN. Messages regarding system processing are queued via routine ADD_SYSTEM_MESSAGE
14 for inclusion upon return to TDMFMAIN.

15 BEGIN:

16 Call TDMFCVOL.

17 VOLUME_PROCESSING_LOOP:

18 Update statistical information for use by the TDMF Monitor. Volume processing handles the "phases" a
19 migration goes through during it's processing life cycle. All routines return to
20 NEXT_VOLUME_PROCESSING or to the appropriate phase.

21 Logically, phase processing is executed in the following sequence:

22 TDMFNVOL, TDMFAVOL, TDMFQVOL, TDMFSVOL, TDMFBVOL (if TDMFSVOL fails), TDMFRVOL
23 and TDMFTVOL. Resume processing (TDMFRVOL) must always be executed if the current volume
24 migration status indicates that the volume is quiesced and thus, prior to execution of TDMFTVOL.

25 There are sub-phases that may be executed asynchronously by an individual sub-task, one for each volume
26 being migrated, during the processing listed below. Each sub-phase executing as part of the individual sub-
27 task communicates with the volume processing main task via posting of a sub-phase event control block
28 (ECB). This sub-task provides three sub-phases within the domain of it's execution. These are the copy sub-
29 phase, refresh sub-phase and synchronization sub-phase.

30 After volume activation occurs, a copy sub-phase is used to copy all data from the source volume to the target
31 volume. A refresh sub-phase is executed at least once copying all data that may have been updated by a
32 Master or Slave system for that volume. This design allows customer access to all data on the source volume,
33 including update activity, during the life of the migration process. The TDMF I/O Monitor module
34 (TDMFIMON) dynamically detects that a Master or Slave system has updated data located on the source
35 volume and communicates this information to the TDMFVOL main task to be used by CSECT TDMFMVOL.
36

37 Prior to volume swap processing, additional refresh sub-phases may be necessary to provide a iterative process
38 since data upon a migrating volume could again have changed by activity on any system during execution of
39 the previous sub-phase. Special processing can cause the execution of the quiesce phase, resume phase, and

LISTING 1

TDMF LOGIC © 1998 AMDAHL CORPORATION refresh sub-phase processing until TDMF dynamically determines that the synchronization sub-phase can completely synchronize the migrating volume(s) based upon time goals specified by volume migration parameters.

In actuality, phases are called and checked in reverse hierarchical sequence from the logical phase processing previously documented because if the phase does not need to be processed, for specified volume, the next lower phase is executed via a GO TO statement for the next logical phase:

- TDMFTVOL - termination processing
- TDMFRVOL - resume processing
- TDMFBVOL - back-out processing
- TDMFSVOL - swap processing
- TDMFQVOL - quiesce processing
- TDMFAVOL - activate processing
- TDMFNVOL - initialize processing Each volume control block (TDMFMSV) contains a word indicating the phases that have been completed or are being requested to be executed upon each of the possible systems. Each phase is represented by a word (32 bits), called the MSV_(phase)MASK. The MSV_(phase)MASK field is initialized to a value of one in all system defined bit positions that do not exist in the TDMF session. Processing for an individual phase and it's corresponding mask, is handled by the appropriate CSECT. For example, swap processing is handled in TDMFSVOL and is controlled with bits in MSV_SMASK.

The appropriate MSV_(phase)MASK bit zero defines that the Master system is requesting the function. A Slave system does not attempt execution of the phase if the Master system has not requested the function (bit zero of the MSV_(phase)MASK is a zero). Bits 1 through 31 are set when the respective slave system completes the phase that has been requested by the Master. The Master system normally only executes the requested phases when all slave systems have responded that the phase has completed. Thus, all bits are set to one. Upon completion of the phase on the Master system, an indicator is set in a volume flag (MSV_VOL_FLAG) indicating that that phase is complete. Processing will continue to the next phase.

Effectively, this TDMF design provides a positive acknowledgment environment, i.e., that all Slave systems only execute the functions requested by the Master system. The Master system only executes the requested phase upon successful completion by all Slave systems for that phase. On the other hand, there are two cases in which a Slave system might like to alter the phase processing sequence, but since a Slave system cannot request processing of a specific phase as bit zero can only be set by the Master system, the Slave system must have a way to notify the Master to alter it's phase processing sequence.

The first case is when a Slave system detects an error via the TDMF I/O Monitor which requires volume termination processing of the migration be invoked.

The second case is that a Slave system detects an error during swap processing which requires that back-out processing be invoked. Since other Slave systems within the TDMF migration session may be present, and may have successfully executed swap processing for the volume, a swap volume processing failure on one Slave system must be communicated via the Master system, to all Slave systems, to invoke back-out processing.

LISTING 1

TDMF LOGIC  © 1998 AMDAHL CORPORATION 1-5: Thus, in these two cases, a Slave system may turn on its designated system bit in MSV_TMASK or MSV_BMASK requesting the Master system to effectively request these functions on all systems. Upon recognition on a Master system the Slave system designated bit is reset to zero by the Master system after the requested functions bit zero is set. This allows the Slave systems designated system bit to be again used as an acknowledgment indicator indicating that the Slave system has completed the requested function.

6-8: During volume phase processing, the Master system examines MSV_TMASK and/or MSV_BMASK at the appropriate points to determine if a Slave system has set their respective bit in MSV_TMASK or MSV_BMASK indicating to the Master to alter it's volume processing sequence.

9: Branch to TDMFTVOL.

10: NEXT_VOLUME_PROCESSING:

11-14: If this volume has completed all phases, go to NEXT_VOLUME. If volume termination is being requested, go to NEXT_VOLUME. If TDMF is executing on a Slave system, go to NEXT_VOLUME. If the copy sub-task does not exist, go to NEXT_VOLUME. If the copy sub-phase has been posted, go to CHECK_COPY_ENDED.

15: NEXT_VOLUME:

16-17: Update statistical information for use in the TDMF Monitor. If any system appears to have failed during the life of the migration, go to NEXT_VOLUME_PROCESSING_SYSTEM_DEAD in CSECT TDMFCVOL.

19-21: If the system is still active, increment all system control block pointers to their next respective entries and if all volumes have not been processed, go to VOLUME_PROCESSING_LOOP. If all volumes have been processed, determine the amount of time that this system should wait before re-awakening.

22: Go to TDMFUVOL.

23: _COMMON ROUTINES THAT ARE USED BY ANY OF THE ABOVE PHASES:_

24: SET_RESUME:

25-26: If a resume I/O to the source volume is being requested, set the request function to resume. Test for number of systems, if one, go to TDMFRVOL, else go to NEXT_VOLUME_PROCESSING.

27: CHECK_SYNCHRONIZATION_COMPLETE:

28-30: Set flag based on the copy task (compare/synchronize) function when the copy synchronization process is complete. If copy task does not terminate normally, check to see if volume (source) I/O is quiesced. If so, resume I/O to source volume and/or terminate processing.

LISTING 1

TDMF LOGIC  © 1998 AMDAHL CORPORATION

1 SET_SWAP:

2 If a swap of the source volume is being requested, set request function to swap. Test for number of systems.
3 If one, go to TDMFSVOL, else continue to NEXT_VOLUME_PROCESSING.

4 If the volume is not currently quiesced, go to NEXT_VOLUME. Else, set request function to quiesce once
5 the refresh end function has completed. If slave systems are involved, the Master will wait until notification
6 from Slave(s) that quiesce request has been processed, before continuing. If automatic migration, quiesce and
7 synchronize without intervention. If prompt or single group option was selected, create addressability to the
8 TDMF Monitor control block (TDMFTSOM), pass indicator to TDMF Monitor that a prompt is required.
9 Wait for response, then quiesce and begin the synchronization sub-phase.

10 CHECK_COPY_ENDED:

11 If the copy sub-phase ended normally, go to NEXT_VOLUME. Since the copy sub-phase did not end
12 normally, ensure that the volume is not quiesced. If quiesced and resumed, set volume termination request
13 function. Else, go to NEXT_VOLUME.

14 SET_TERMINATION:

15 If a termination of the source volume is being requested, set request function to terminate. Ensure that all
16 Slave systems MSV_TMASK respective bit is set to zero so that all Slave systems will not believe that they
17 have completed slave processing in case one of the slave systems was requesting the Master system to alter
18 it's normal volume processing sequence. Terminate the copy sub-task for this volume's migration. Test for
19 number of systems, if one, go to TDMFTVOL, else go to NEXT_VOLUME_PROCESSING.

20 ABEND_TERMINATION_PROCESSING:

21 Set abend termination as a severe error, indicating if the error is recoverable or unrecoverable, and the type
22 of system, Master or Slave, upon which error occurred.

23 If a read/reserve is outstanding, this means record zero is still in memory. Go back and process volumes again
24 in order that normal update of system record zero and release of the COMMDS, processing will complete.
25 If not, re-read record zero.

26 UPDATE_STATISTICAL_INFORMATION:

27 Set the time interval between updates to the Communications Data Set (COMMDS) based on phase:

28 • 30 seconds - copy phase (default)

29 • 15 seconds - $1^{st}$ refresh pass

30 • 10 seconds - $2^{nd}$ refresh pass

31 • 5 seconds - $3^{rd}$ and subsequent refresh passes

32 • 1 second - quiesce, synchronize, swap and resume processing

33

34 A TDMF systems response time is set to be normally the minimum time interval from the above, based upon
35 every volumes phase.

36 TDMF was designed to be as responsive as possible without placing a large burden upon the CPU. On the
37 other hand, there are times that the TDMF system must be extremely responsive to minimize the impact to

LISTING 1

TDMF LOGIC  © 1998 AMDAHL CORPORATION 1 customer application I/O operations that have been quiesced and lasting until the I/O operations have been
2 resumed. This includes the time required to do volume quiesce phase processing, volume synchronize sub-
3 phase processing, volume swap phase processing, and volume resume phase processing. This is why the
4 systems response time is set to one second if any volumes migration is quiesced and not resumed, which
5 encompasses the aforementioned phases and sub-phase.

6 Therefore, TDMF will only be as responsive as required based upon necessity.

7 Calculate the elapsed time of processing that has been used by the TDMFVOL main task during this
8 execution. Calculate the elapsed time for each phase as well as total clock time for migration. Calculate the
9 average device response time for each volume migration. These values are used in the Monitor.

10 CALL_TDMFICOM:

11 Call the TDMF I/O communications routine (module TDMFICOM) to execute the requested read or write
12 operation. If TDMF is executing on a system that has been previously determined to have been "dead", the
13 I/O operation is allowed only if it is a write I/O operation and the write I/O operation is not attempting to re-
14 write system record zero which contains all TDMFMSE, TDMFMSV, and TDMFMSVE information. This
15 will prevent a system that has "died" from re-awakening and destroying system record zero information that
16 may be in use by the recovery process and it's subsequent termination of the TDMF system.

17 CALL_TDMFIVOL:

18 Call the TDMF volume I/O routine (module TDMFIVOL) to execute the function being requested.

19 CALL_UCB_VOL:

20 The purpose of this routine is to pin or unpin a MVS Unit Control Block (UCB) as requested by the caller.
21 The purpose of the pin or unpin is to prevent MVS from invoking Dynamic Reconfiguration Management
22 (DRM) functions, thereby changing the address of the UCB during the volume migration process.

23 MODIFY_UCBDDT:

24 Determine each source and target volumes MVS UCBs Device Dependent Table (DDT) via the common
25 extension in the UCB. Processing will depend on a caller option of chain or unchain.

26 An integral design consideration in TDMF requires that TDMF dynamically modify the Device Dependent
27 Table (DDT) used by MVS' IOS component such that the TDMF I/O Monitor (module TDMFIMON) receives
28 control during customer I/O operations against the migrating volumes during the life of the volume
29 migrations. In order to provide this function transparently, a TDMF control block (TDMFDDTE) is allocated
30 for each source and target volume embedded within the TDMFWORK control block. Current standard MVS
31 information located in MVS' DDT is copied to the newly allocated TDMFDDTE and additional information
32 is placed into the TDMFDDTE to ensure that the TDMF I/O Monitor (module TDMFIMON) receives control
33 at the proper time for it's processing. The chaining or unchaining operation being requested dynamically
34 modifies the standard MVS UCB to point to the TDMFDDTE during a chain operation or reset to point to
35 the standard MVS DDT for an unchain operation.

36 The address of MVS' standard Start I/O (SIO) Device Dependent Exit in MVS' standard DDT is changed to
37 point to the TDMFIMON main entry point, and it's address is saved in the TDMFDDTE control block. This
38 allows the TDMFIMON routine to receive control at the proper time during MVS' Input/Output Supervisor
39 (IOS) processing transparently.

LISTING 1

TDMF LOGIC  © 1998 AMDAHL CORPORATION

1. If there was an error detected in TDMFIMON, the Functional Recovery Routine (FRR) in TDMFIMON will
2. have already reset the MVS DDT pointer in the UCB and indicated to TDMFVOL and TDMFCOPY sub-task
3. processing that they should terminate that volumes migration with errors.

4. During de-activation of TDMFIMON, it is possible that an I/O operation is still running and has not had it's
5. I/O interrupt processed. To be sure, the last Input/Output Supervisor Block (IOSB) is checked for the
6. Input/Output Supervisor Disable Interrupt Exit (IOSDIE) routine pointer. If the IOSDIE routine pointer still
7. points to the DIE entry point at TDMFIMON+4, it is replaced with the normal MVS IOSDIE routine address
8. which will be saved by TDMFIMON during its processing as a part of device dependent SIO routine.

9. CLEAN_IOSLEVEL:

10. A TDMF design consideration requires that TDMF be able to quiesce and prevent customer I/O operations
11. from being executed to the source and target volumes during critical phases of a volumes' migration. TDMF
12. implements this requirement based upon the fact that MVS IOS will not allow an I/O operation, represented
13. by an IOSB, who's IOSLEVEL value is numerically less than the UCBLEVEL field of the UCB to which the
14. I/O operation is being directed.

15. Normal I/O operations have an IOSLEVEL of X'01'; the UCB has a UCBLEVEL of X'01'. During quiesce
16. processing, the UCBLEVEL will be changed via an IOSLEVEL macro to the Dynamic Device
17. Reconfiguration (DDR) level of the MVS operating system. The UCBLEVEL is effectively a priority which
18. only allows subsequent I/O operations, represented by an IOSB, of equal or higher priority to be issued against
19. the migrating volume.

20. The purpose of this routine is to ensure during volume termination processing that a UCB is not inadvertently
21. left with a UCBLEVEL which is not equal to the normal UCBLEVEL of X'01'.

22. DEACT_IOMON:

23. The TDMF I/O Monitor (module TDMFIMON) examines the TDMFDDTE to determine if the TDMF system
24. still requires the module to monitor I/O operations being executed against the migration volumes. This
25. routine indicates to TDMFIMON that monitoring of I/O operations is no longer required.

26. MS_ADDRESSABILITY:

27. Set up standard system addressing to the system control block for the system (Master or Slave) upon which
28. TDMF is being executed (TDMFMSE), the first volume control block (TDMFMSV) representing the first
29. migration, and the first volume entry control block (TDMFMSVE) for the first volume on the this system.
30. Next, set up addressing to a work control block (TDMFWORK) which contains addressing capability to the
31. Device Dependent Table Extended (TDMFDDTE).

32.

LISTING 1

TDMF LOGIC  © 1998 AMDAHL CORPORATION

1. TS_ADDRESSABILITY:
2. Provide addressability to the control block to communicate to the TDMF TSO Monitor. This control block
3. provides a communications vehicle between the TDMF main task and the TSO user executing the TDMF
4. Monitor.
5. RESERVE_COM:
6. In order to allow multiple systems in a TDMF session to communicate with each other, the status of all
7. volumes and all systems during volume migration processing, is recorded in the COMMDS. To protect the
8. data integrity of the data within the COMMDS, the TDMF system logically provides protection via a standard
9. MVS reserve or enqueue macro and physically provides protection with an actual hardware reserve channel
10. command word which will be issued during the read of system record zero. This will prevent multiple TDMF
11. systems from attempting to use the information recorded in the COMMDS at the same instant in time.
12. RELEASE_COM:
13. At the end of the update of system record zero in the COMMDS, a logical MVS dequeue operation is
14. performed to indicate that the COMMDS may be accessed by another TDMF system. On the other hand, the
15. actual physical release operation is dependent upon whether the MVS operating system has a physical reserve
16. upon the volume belonging to another application using the same DASD volume containing the COMMDS.
17. MVS will not release the physical protection until no applications still require any physical volume protection.
18. ADD_SYSTEM_MESSAGE:
19. Add designated system message to queue of TDMF system messages located at the end of the main TDMF
20. control block (TDMF).
21. ADD_MESSAGE:
22. Add designated volume message to queue of volume messages located in the TDMF volume message control
23. block (TDMFVMSG).
24. LOCK_LOCAL:
25. Obtain the MVS local lock.
26. LOCK_CMS:
27. Obtain the Cross Memory Services (CMS) lock.
28. UNLOCK_LOCAL:
29. Release the MVS local lock.
30. UNLOCK_CMS:
31. Release the CMS lock.
32. UCB_UNALLOCATE:
33. Allow the TDMF system to clear allocation information placed in the UCB during activate volume processing
34. in CSECT TDMFAVOL.
35.

LISTING 1

TDMF LOGIC © 1998 AMDAHL CORPORATION

1. TDMF_RECOVERY:
2. This is the entry point for the MVS Extended Set Task Abend Exit (ESTAE) recovery routine. This routine
3. ensures that the TDMFVOL module receives control in the event that the TDMF main task attempts an abend
4. condition.
5. 
6. CSECT: TDMFCVOL
7. Set up parameters to read the COMMDS, system record zero consisting of all information in the TDMFMSE,
8. TDMFMSV and TDMFMSVE control blocks. In addition, if this is the Master system, request that the I/O
9. operation also read all Volume Refresh Notification Queue (TDMFVRNQ) control blocks. With one I/O
10. operation, this system record zero information and all TDMFVRNQ control blocks will be read by calling the
11. RESERVE_COM and CALL_ICOM routines.
12. READ_COMPLETED_OK:
13. Update the system entry heartbeat to indicate that this TDMF system is still "alive".
14. There is a 15 minute time interval before another system may believe that this system is "dead". If another
15. system believes that this system is "dead", the VOLUME_PROCESSING_SYSTEM_DEAD routine, located
16. in this CSECT, will be invoked on all systems that detect that this system is "dead". These routines will
17. terminate all volume migrations, in a controlled fashion, based upon each volumes' current migration phase
18. or sub-phase, for each system, in the TDMF life cycle sequence. These routines will modify the normal
19. volume processing loop described in CSECT TDMFVOL previously.
20. Determine if another system has previously detected that this TDMF system was ever considered "dead". The
21. only way that a system may appear "dead" to another system, is if the logical processor was stopped physically
22. and while this system did not hold a reserve on the COMMDS. If this is true, it may be possible to start
23. TDMF processing by having the logical processor re-started. Therefore, this TDMF system, which has been
24. considered "dead" and has re-awakened, will invoke a specialized volume processing loop to terminate all
25. volume migrations consistent with the recovery processes used by all systems who had considered this system
26. "dead". Those processes are described in the VOLUME_PROCESSING_SYSTEM_DEAD, located in this
27. CSECT and are dependent upon whether the system that "died" (this system), is a Master or Slave.
28. If this system was not previously considered "dead" and re-awakened, then determine if this is a Master or
29. Slave system.
30. If this is a Slave system, determine if the Master system is still "alive". If the Master is still "alive", return
31. to VOLUME_PROCESSING_LOOP in CSECT TDMFVOL.
32. If this is a Master system, determine if any Slave system is "dead". If all Slave systems are still "alive", return
33. to VOLUME_PROCESSING_LOOP in CSECT TDMFVOL.
34. VOLUME_PROCESSING_SYSTEM_DEAD:
35. If any system detects that a system is "dead", mark the appropriate systems entry that it is considered "dead",
36. and set the MSV_(phase)MASK to the appropriate phase to either terminate the volume migrations, back-out
37. the volume migrations, or to consider the volume migrations complete if swap processing has completed.
38. Ensure that any volume that has had I/O operations quiesced to it, be resumed.
39. NEXT_VOLUME_PROCESSING_SYSTEM_DEAD:

LISTING 1

TDMF LOGIC © 1998 AMDAHL CORPORATION

| | |
|---|---|
| 1 | Increment all system control blocks to their next respective entries and if all volumes have not been processed, |
| 2 | go to VOLUME_PROCESSING_SYSTEM_DEAD. If all volumes have been processed, determine the |
| 3 | amount of time that this system should wait before re-awakening. |
| 4 | Go to TDMFUVOL. |
| 5 | |
| 6 | CSECT: TDMFTVOL |
| 7 | The purpose of this phase is to terminate the volume processing for a specific volume. |
| 8 | If volume processing is complete for this volume, go to NEXT_VOLUME_PROCESSING in CSECT |
| 9 | TDMFVOL. |
| 10 | Determine if the TDMF I/O Monitor (module TDMFIMON) is still active and monitoring for I/O operations |
| 11 | for this specific volume via a call to CHECK_IMON. If the TDMF I/O Monitor is still active, go to |
| 12 | MONITOR_ALIVE. If any error occurs during TDMFIMON processing, TDMFIMON will signal the error |
| 13 | condition by turning off a bit in the TDMFDDTE control block indicating that the I/O Monitor is no longer |
| 14 | active. Therefore, if the I/O Monitor is no longer active, go to MONITOR_DEAD. |
| 15 | MONITOR_ALIVE: |
| 16 | If the TDMFVOL task has not abended on this system, go to THIS_SYSTEM_NOT_ABENDING. |
| 17 | MONITOR_DEAD: |
| 18 | If this is a Slave system, request termination of the specific volume migration by setting this systems bit in |
| 19 | the MSV_TMASK field. This effectively asks the Master to terminate this volume's migration. |
| 20 | If this is a Master system, and the volume is quiesced and not resumed, go to SET_RESUME in CSECT |
| 21 | TDMFVOL. If the volume is not quiesced or was quiesced and then later resumed, set the request termination |
| 22 | function for this volume and terminate the copy task. |
| 23 | THIS_SYSTEM_NOT_ABENDING: |
| 24 | If this is a Master system, go to CHECK_FOR_SLAVE_TERMINATION_REQUEST. Otherwise, this is a |
| 25 | Slave system which will examine the Master systems entry to determine if a failure occurred upon the Master |
| 26 | system and that the Master system requested system termination of the TDMF session on all Slave systems. |
| 27 | If volume termination processing has completed for this Slave system, go to |
| 28 | NEXT_VOLUME_PROCESSING in CSECT TDMFVOL. If volume termination processing has not |
| 29 | completed upon this Slave system, go to VOLUME_TERMINATION_PROCESSING_SLAVE. |
| 30 | CHECK_FOR_SLAVE_TERMINATION_REQUEST: |
| 31 | If this is a Slave system, go to NORMAL_TERMINATION_CHECK. Determine if any Slave system |
| 32 | requested termination due to an initialization failure. Determine if any Slave system requested termination |
| 33 | of the TDMF session. If either is requested, terminate the copy task and go to GIVE_SLAVE_TERM_MSG. |
| 34 | TEST_SLAVE_VOLUME_TERMINATION_REQUEST: |
| 35 | If the volume termination request function has been set, go to NORMAL_TERMINATION_CHECK. If any |
| 36 | Slave system has requested volume back-out processing for this volume, set that Slave systems back-out |
| 37 | volume request bit in MSV_BMASK to zero. Set the request function in MSV_BMASK to one to cause all |
| 38 | Slave systems to invoke volume back-out processing. Go to NORMAL_TERMINATION_CHECK. |

LISTING 1

TDMF LOGIC  © 1998 AMDAHL CORPORATION

1    NOT_BACKOUT_REQUEST:

2-6    Determine if any Slave system has requested termination of this volume migration. If no, go to NORMAL_TERMINATION_CHECK. If any Slave system has requested volume termination processing for this volume, set that Slave systems volume termination request bit in MSV_TMASK to zero. Set the request function bit in MSV_TMASK to one to cause all Slave systems to invoke volume termination processing. Go to NORMAL_TERMINATION_CHECK.

7    GIVE_SLAVE_TERM_MSG:

8-11    If the volume termination request function has been set, go to NORMAL_TERMINATION_CHECK. Terminate copy sub-task. If the synchronization sub-phase ECB is waiting to be posted, post the sub-phase telling the sub-phase to terminate, then go to TERM_QUIESCE_CHECK. If the refresh sub-phase ECB is waiting to be posted, post the sub-phase telling the sub-phase to terminate.

12    TERM_QUIESCE_CHECK:

13-15    If the volume has been quiesced, go to CHECK_SYNCHRONIZATION_COMPLETE. Set the termination request function in MSV_TMASK. If the number of systems is not equal to one, go to NEXT_VOLUME_PROCESSING in CSECT TDMFVOL.

16    NORMAL_TERMINATION_CHECK:

17-21    If this is a Slave system, go to SKIP_CUSTOMER_TERMINATE. Get addressability to the TDMFTSOM control block. If TDMF has already acknowledged a change in the synchronization goal time value, go to TEST_CUSTOMER_TERMINATE. If the customer has not requested a change in volume synchronization goal time, go to TEST_CUSTOMER_TERMNATE. Acknowledge volume synchronization goal time change and save the value for the synchronization goal.

22    TEST_CUSTOMER_TERMINATE:

23-26    If TDMF has already acknowledged a volume termination request, go to SKIP_CUSTOMER_TERMINATE. If the customer has not requested volume termination, go to SKIP_CUSTOMER_TERMINATE. If the customer has requested volume termination, acknowledge the volume termination request and go to GIVE_SLAVE_TERM_MSG.

27    SKIP_CUSTOMER_TERMINATE:

28-30    If volume termination is not requested (MSV_TMASK, bit zero set), then go to TDMFRVOL. If any Slave system has not processed the volume termination request, go to VOLUME_TERMINATION_SLAVE. If this is a Slave system, go to NEXT_VOLUME_PROCESSING.

LISTING 1

TDMF LOGIC © 1998 AMDAHL CORPORATION

| | |
|---|---|
| 1 | VOLUME_TERMINATION_PROCESSING_MASTER: |
| 2 | Call DEACT_IOMON. If all Slave systems have not acknowledged volume termination processing, go to |
| 3 | VOLUME_TERMINATION_PROCESSING_SLAVE. Set the volume termination and complete flags in |
| 4 | MSV_VOL_FLAG. Release page frames associated with copy cylinder I/O areas. Decrement the number |
| 5 | of volume migrations active on this system. If there are still active volumes being migrated, go to |
| 6 | CHECK_UCB_ALLOCATION. If the number of systems that are active is zero, go to |
| 7 | CHECK_UCB_ALLOCATION. Decrement the number of systems active and mark this system as inactive. |
| 8 | Go to CHECK_UCB_ALLOCATION. |
| 9 | VOLUME_TERMINATION_PROCESSING_SLAVE: |
| 10 | If this is a Master system, go to NEXT_VOLUME_PROCESSING. If this Slave system has completed |
| 11 | volume termination processing for this volume, go to NEXT_VOLUME_PROCESSING. |
| 12 | VOLUME_TERMINATION_PROCESSING_MASTER_DEAD: |
| 13 | Call DEACT_IOMON. Set this systems volume termination complete in MSV_TMASK. Decrement number |
| 14 | of volumes active on this system. |
| 15 | CHECK_UCB_ALLOCATION: |
| 16 | Call CLEAN_IOSLEVEL for the target volume. Call MODIFY_UCBDDT for the target volume requesting |
| 17 | an unchain operation. Call CLEAN_IOSLEVEL for the source volume. Call MODIFY_UCBDDT for the |
| 18 | source volume requesting an unchain operation. Call LOCK_LOCAL. Call LOCK_CMS. Call |
| 19 | UCB_UNALLOCATE for the target volume. Call UCB_UNALLOCATE for the source volume. Call |
| 20 | UNLOCK_CMS. Call UNLOCK_LOCAL. Go to NEXT_VOLUME_PROCESSING. |
| 21 | CHECK_IMON: |
| 22 | If the volume migration is not active, via a check of MSV_AMASK on the Slave system, or |
| 23 | MSV_VOL_FLAG on a Master system, return to the caller. If the volume is backed-out or swapped, return |
| 24 | to the caller. If the I/O Monitor is in "quiet mode" and not currently monitoring for I/O operations, return |
| 25 | to the caller. If the I/O Monitor is not active, return to the caller signaling that the I/O Monitor is "dead". |
| 26 | Invoke termination of volume migration. This check is made for both the source and target volumes in the |
| 27 | migration pair. If the TDMFDDTE control block is not properly chained to the MVS UCB, return the same |
| 28 | error condition. |
| 29 | |
| 30 | CSECT: TDMFRVOL |
| 31 | The purpose of this phase is to resume the volume processing for a specific volume. |
| 32 | In order minimize the impact to customer I/O operations, the amount of time that a volume cannot |
| 33 | successfully execute I/O operations (from the time that the volume is quiesced until the volume is resumed), |
| 34 | is kept to a minimum. Normally, the Master system waits for a positive acknowledgment from all Slave |
| 35 | systems prior to executing a function that has been requested. The TDMF system design allows the resume |
| 36 | operation to take place immediately upon the Master system without waiting for a positive acknowledgment |
| 37 | from all Slave systems. This minimizes the impact above. On the other hand, the normal next phase is the |
| 38 | volume termination phase, and that phase will not be allowed to be requested until the Master system has |
| 39 | received a positive acknowledgment from all Slave systems that the volume has successfully resumed. |

LISTING 1

TDMF LOGIC  © 1998 AMDAHL CORPORATION

1  If resume processing has not been requested via MSV_RMASK, go to TDMFBVOL. If this system has
2  already resumed processing for this volume as indicated in MSV_RMASK or in MSV_VOL_FLAG, then go
3  to NEXT_VOLUME_PROCESSING in CSECT TDMFVOL.

4  If this is a Master system and this volume is not involved in multiple refresh phases, remove the TDMF I/O
5  Monitor from "quiet mode". Resume I/O operations to customer applications via the issuance of an
6  IOSLEVEL MVS macro to reset the UCBLEVEL from the DDR level to the normal level for both the source
7  and target volumes. Indicate that the volumes are resumed via setting a resume indicator in
8  MSV_VOL_FLAG or the respective system bit in MSV_RMASK. If this is a Slave system, go to
9  NEXT_VOLUME_PROCESSING in CSECT TDMFVOL.

10  If this Master system has not received a positive acknowledgment from all Slave systems that this volume has
11  successfully resumed, go to NEXT_VOLUME_PROCESSING in CSECT TDMFVOL. If another refresh sub-
12  phase is required for this volume, reset the MSV_RMASK and the MSV_QMASK indicating that this volume
13  is no longer quiesced, nor resumed. Decrement the volume time interval that system should awaken for
14  processing of this volume by seconds without allowing the value to go below the value of 5 seconds.
15  Increment the refresh number and post the synchronization sub-task ECB to start another refresh sub-phase.
16  Go to NEXT_VOLUME_PROCESSING in CSECT TDMFVOL.

17

18  CSECT: TDMFBVOL

19  The purpose of this phase is to back-out the volume processing for a specific volume.

20  If back-out processing has not been requested via MSV_BMASK, go to TDMFSVOL. If this system has
21  already performed back-out processing for this volume as indicated in MSV_BMASK or in
22  MSV_VOL_FLAG, then go to NEXT_VOLUME_PROCESSING in CSECT TDMFVOL.

23  Volume back-out processing is invoked due to one of two possible failures during swap processing. The first
24  possible failure can be due to a failure while re-writing the volume serial numbers on the source and target
25  volumes. The second possible failure can occur during the actual swap process when the addresses of the
26  UCBs are modified.

27  If this system does not require back-out processing from the swap function, go to
28  REWRITE_VOLUME_LABELS. If the source volume is a JES3 system managed device, issue a Subsystem
29  Function Request to JES3 to validate and indicate that a swap function is starting and that the UCB addresses
30  involved in the back-out processing are correct and that back-out processing may continue. Invoke back-out
31  processing by executing procedures documented in CSECT TDMFSVOL, in order to reverse the original swap
32  process. If the source volume is a JES3 system managed device, issue a Subsystem Function Request to JES3
33  to notify JES3 that the swap processing is complete.

34  Ensure that both the source and target volumes are ready for I/O operations as the previous swap process
35  marks the devices as not ready.

36

LISTING 1

TDMF LOGIC © 1998 AMDAHL CORPORATION

1 REWRITE_VOLUME_LABELS:

2 If this is a Slave system, mark back-out volume processing complete in MSV_BMASK for this system, and
3 go to NEXT_VOLUME_PROCESSING in CSECT TDMFVOL. Call CALL_TDMFIVOL passing a request
4 of write volume label with the addresses of the source and target UCBs in order to re-write the volume serial
5 numbers. Mark the target volume offline. Set appropriate bit in MSV_VOL_FLAG to indicate that back-out
6 processing is complete for the volume. Set the resume request function bit in MSV_RMASK. If the number
7 of systems is equal to one, go to TDMFRVOL.

8

9 CSECT: TDMFSVOL

10 The purpose of this phase is to perform swap processing for a specific volume.

11 If swap processing has not been requested via MSV_SMASK, go to TDMFQVOL. If this system has already
12 completed swap processing for this volume as indicated in MSV_SMASK or in MSV_VOL_FLAG, then go
13 to NEXT_VOLUME_PROCESSING in CSECT TDMFVOL.

14 Call LOCK_LOCAL. Call LOCK_CMS. Call UCB_UNALLOCATE for the source and target volumes. Call
15 UNLOCK_CMS. Call UNLOCK_LOCAL.

16 There are two types of migration that may be requested by the customer. If a Point-In-Time migration has
17 been requested, go to SWAP_COMPLETE. If a Swap migration has been requested, continue.

18 Initialize all return codes for Event Notification Facility (ENF) calls, swap processing, back-out processing,
19 and JES3 Subsystem Request Functions.

20 If the source volume is a JES3 system managed device, issue a Subsystem Function Request to JES3 to
21 validate and indicate that a swap function is starting and that the UCB addresses involved in the swap
22 processing are correct and that swap processing may continue.

23 Standard MVS processing invokes a module called IOSVSWAP. Information located in the UCB Device
24 Class Extension (DCE) for the source and target volumes may not be correct in a standard MVS environment.
25 The target volumes information may not be available as the device may be offline. The TDMF design requires
26 that the source and target volumes be online during the life of the TDMF migration process. This design
27 therefore, eliminates the possibility of the UCBs DCE containing incorrect information.

28 TDMF is designed to ensure that the UCB DCE information is properly swapped between the source and
29 target volumes. Thus, prior to the swap process, the UCB DCE information is saved for the source and target
30 volumes.

31 WRITE_VOLUME_LABELS:

32 Call CALL_TDMFIVOL passing a request of write volume label with the addresses of the source and target
33 UCBs in order to write the proper volume serial numbers.

34 SWAP_PROCESS:

35 Call LOCK_LOCAL. Call LOCK_CMS. Call MVS module IOSVSWAP passing the addresses of the source
36 and target UCBs to perform swap processing.

37 Call UNLOCK_CMS. Call UNLOCK_LOCAL. If swap processing completed normally in module
38 IOSVSWAP, go to FIX_UCB_NEXT. If swap processing failed in module IOSVSWAP, and the source

LISTING 1

TDMF LOGIC © 1998 AMDAHL CORPORATION 1,2: volume is a JES3 system managed device, issue a Subsystem Function Request to JES3 to notify JES3 that swap processing completed unsuccessfully.

3,4: If this is the Master system, set the back-out request function in MSV_BMASK, and go to NEXT_VOLUME_PROCESSING in CSECT TDMFVOL.

5,6: If this is a Slave system, mark that this Slave system requests back-out volume processing in MSV_BMASK for this system, and go to NEXT_VOLUME_PROCESSING in CSECT TDMFVOL.

7: FIX_UCB_NEXT:

8,9: Ensure that both the source and target volumes are ready for I/O operations as the previous swap process marks the devices as not ready.

10–15: Mark the original source UCB offline. Set the original source UCB volume serial number to that of the new volume serial number if the customer so specified. Use a compare and swap double loop to swap the UCB DCE information between the original source and target UCBs from the saved DCE information. If the source volume is a JES3 system managed device, issue a Subsystem Function Request to JES3 to notify JES3 that the swap processing is complete. Use standard ENF routine to notify MVS and any ENF "listeners" that a DDR swap operation has occurred involving the source and target volumes.

16,17: If this is a Slave system, indicate that swap volume processing is complete in MSV_SMASK for this system, and go to NEXT_VOLUME_PROCESSING in CSECT TDMFVOL.

18,19: Set appropriate bit in MSV_VOL_FLAG to indicate that swap processing is complete for the volume. Set the resume request function bit in MSV_RMASK. If the number of systems is equal to one, go to TDMFRVOL.

21: CSECT: TDMFQVOL

22: The purpose of this phase is to perform quiesce processing for a specific volume.

23: If quiesce processing has not been requested via MSV_QMASK, go to TDMFAVOL.

24: TEST_DEVICE_STATUS:

25–27: Call the IOSGEN_ROUTINE to determine if the quiesce function may continue for the source volume. If the return from IOSGEN_ROUTINE indicates that quiesce processing may not continue, retry 50 times after waiting 10 milliseconds each time. If quiesce processing can still not continue, go to TDMFMVOL.

28–30: If this a Slave system that has already completed quiesce processing for this volume as indicated in MSV_QMASK, then go to TDMFMVOL. If this is a Master system and the volume has completed the quiesce process, go to CHECK_SYNCH_COMPLETE.

31–34: Issue an IOSLEVEL macro to set the IOSLEVEL to the DDR level for the source volume. Call the IOSGEN_ROUTINE. If the IOSGEN_ROUTINE indicates that the source volume is not quiesced due to either a source volume is active with a customer I/O operation or the source volume is in a reserve status, then go to TEST_DEVICE_STATUS.

35–38: Issue an IOSLEVEL macro to set the UCBLEVEL to the DDR level for the target volume. Set the TDMF I/O Monitor to "quiet mode". If this is a Slave system, set the respective system bit in MSV_QMASK. On a Master system, the quiesce complete indicator is delayed being set until TDMFMVOL processing. Go to TDMFMVOL.

LISTING 1

TDMF LOGIC © 1998 AMDAHL CORPORATION

| | |
|---|---|
| 1 | IOSGEN_ROUTINE: |
| 2 | This is a generalized routine that provides multiple functions similar to an MVS IOSGEN macro. Basically, |
| 3 | the routine returns with a return code of zero if the source volume has no active I/O operation and there is no |
| 4 | reserve issued against it, in a shared DASD environment. If a source volume is active with an I/O operation, |
| 5 | a return code of four is set. If an I/O operation is not active on the source volume, but a reserve or pending |
| 6 | reserve is outstanding, return with return code four. |
| 7 | |
| 8 | CSECT: TDMFAVOL |
| 9 | The purpose of this phase is to perform activate processing for a specific volume. |
| 10 | If activate processing has not been requested via MSV_AMASK, go to TDMFNVOL. If this system has |
| 11 | already completed activate processing for this volume as indicated in MSV_AMASK or in |
| 12 | MSV_VOL_FLAG, then go to CSECT TDMFMVOL. |
| 13 | Call LOCK_LOCAL. Call LOCK_CMS. Call UCB_ALLOCATE for the source and target volumes. Call |
| 14 | MODIFY_UCBDDT to request a chain operation for the source and target volumes. Set the TDMF I/O |
| 15 | Monitor to "active mode". Call UNLOCK_CMS. Call UNLOCK_LOCAL. |
| 16 | If this is a Master system, issue ATTACHX macro to create this volume's migration copy sub-task which will |
| 17 | control three sub-phases previously described. If this is a Slave system, indicate that activate volume |
| 18 | processing is complete in MSV_AMASK for this system, and go to TDMFMVOL. If this is a Master system, |
| 19 | set volume activate complete in MSV_VOL_FLAG and to go TDMFMVOL. |
| 20 | UCB_ALLOCATE: |
| 21 | The purpose of this phase is to prevent the MVS operating system from changing the device status of the |
| 22 | source and target volume during a migration. This is done by updating the UCB with pseudo-allocation |
| 23 | information. |
| 24 | |
| 25 | CSECT: TDMFNVOL |
| 26 | The purpose of this phase is to perform initialization processing for a specific volume. |
| 27 | If initialization processing has not been requested via MSV_IMASK, go to NEXT_VOLUME_PROCESSING. |
| 28 | If this system has already completed initialization processing for this volume as indicated in MSV_IMASK, |
| 29 | and this is a Slave system, then go to NEXT_VOLUME_PROCESSING. If this Slave system has completed |
| 30 | volume initialization processing, set the respective system bit MSV_IMASK. On all systems, set an indicator |
| 31 | in MSV_TDMF_ACT_MASK that this TDMF system is active with at least one volume migration. |
| 32 | Increment TDMF_NUM_SYS_ACT which represents the number of systems that are active. Increment |
| 33 | MSE_SV_NUM_ACTIVE which represents the number of volumes that are active on this system. If this is |
| 34 | a Slave system, go to NEXT_VOLUME_PROCESSING. Set the activate request function bit in |
| 35 | MSV_AMASK. If the number of volumes is equal to one, go to TDMFAVOL, else go to |
| 36 | NEXT_VOLUME_PROCESSING. |
| 37 | CSECT: TDMFMVOL |
| 38 | The TDMF I/O Monitor monitors I/O update activity against the source volume during the life of a normal |
| 39 | migration, from the time the volume is activated until the volume has completed quiesce processing and no |

LISTING 1

TDMF LOGIC © 1998 AMDAHL CORPORATION 1  further customer I/O operations are allowed against the source volume. The TDMF design allows the TDMF
2  I/O Monitor (TDMFIMON) to collect information concerning the cylinders and tracks on a volume that have
3  been updated, and this information is saved into the TDMFVRNQ control block. During TDMFUVOL
4  processing a Slave system will write the results of its output TDMFVRNQ control block to the COMMDS in
5  a specified location for each volume in the migration process. During TDMFCVOL processing, the Master
6  system reads all TDMFVRNQ control blocks for all Slave system that have been previously written.

7  The TDMF system during processing within this CSECT, must convert and merge all cylinder and track
8  information specific to a volume, located within all TDMFVRNQ control blocks for that volume and the
9  TDMFVRNQ control block still in memory on the Master system into a volume refresh bit map
10  (TDMFVRBM) control block. Thus the TDMFVRBM control block represents the cumulative update
11  requests that have occurred during the last TDMF processing phase.

12  If this is a Slave system, go to SLAVE_UPDATE_PROCESSING.

13  MASTER_UPDATE_PROCESSING:

14  Call EXCHANGE_VRNQ. Process all VRNQ entries located in TDMFVRNQ control block being processed,
15  updating the active TDMFVRBM control block. Update the time stamp indicating the time of the control
16  block that has just been processed by the Master system. If the copy sub-phase is not complete, go to
17  NEXT_VOLUME_PROCESSING.

18  If the refresh sub-phase has started and is not complete, go to NEXT_VOLUME_PROCESSING. If the
19  refresh sub-phase has started and is now complete, go to SET_SYNCH. Else call EXCHANGE_VRBM. Call
20  XPOST_SYNCH.

21  SET_SYNCH:

22  If the source volume is not quiesced on this system, go to NEXT_VOLUME_PROCESSING. Set the volume
23  quiesced flag in MSV_VOL_FLAG. If the synchronization sub-phase is not waiting to be posted, go to
24  NEXT_VOLUME_PROCESSING. Call EXCHANGE_VRBM. Determine if the number of cylinders and
25  tracks to be updated during the possible synchronization sub-phase can be accomplished within the
26  synchronization time goal value specified by the customer. Go to SYNCH_VOLUME_NOW. If the customer
27  set the synchronization time goal value to 999 (as soon as possible), go to SYNCH_VOLUME_NOW. If the
28  synchronization time goal cannot be met, go to ANOTHER_REFRESH.

29  SYNCH_VOLUME_NOW:

30  Indicate that this volume is ready for synchronization. If this volume is not part of a single group session and
31  no prompt is required, then post the synchronization sub-phase to begin processing. Go to
32  CHECK_SYNCHRONIZATION_COMPLETE. If this volume is not part of a single group session and a
33  prompt is required, go to NORMAL_PROMPT_TESTING.

34  Since this volume is a part of a single group session, go to ANOTHER_REFRESH if volumes in the session
35  have not reached a synchronization ready state.

36

LISTING 1

TDMF LOGIC © 1998 AMDAHL CORPORATION

1 NORMAL_PROMPT_TESTING:

2 If a response has not been received from the TDMF TSO Monitor to continue synchronization, go to
3 ANOTHER_REFRESH. If a positive acknowledgment has not been received, go to ANOTHER_REFRESH.

4 XPOST_SYNCH:

5 Post the synchronization sub-phase to begin synchronization processing. Go to
6 NEXT_VOLUME_PROCESSING.

7 ANOTHER_REFRESH:

8 Indicate that this volume requires another refresh pass. Indicate that the previous refresh process has
9 completed. Indicate that the source volume is no longer quiesced. Go to SET_RESUME in CSECT
10 TDMFVOL.

11 SLAVE_UPDATE_PROCESSING:

12 Call EXCHANGE_VRNQ. Go to NEXT_VOLUME_PROCESSING.

13 EXCHANGE_VRNQ:

14 This routine exchanges the pointers between active and back-up TDMFVRNQ control blocks. This allows
15 the TDMF I/O Monitor (TDMFIMON) to save its new TDMFVRNQ information into a newly supplied
16 TDMFVRNQ control block. The TDMF system keeps a time stamp, by system and by volume, containing
17 the time of the last TDMFVRNQ control block that was processed into the TDMFVRBM control block. If
18 this time stamp is equal to the time stamp in the output TDMFVRNQ control block previously specified for
19 output processing, this indicates that the TDMF Master system has successfully processed the output
20 TDMFVRNQ control block into the TDMFVRBM control block. In this case, the back-up TDMFVRNQ
21 control block is moved to the output TDMFVRNQ control block for subsequent processing. If the time stamps
22 are not equal, this indicates that the TDMF Master system has not processed the information located in the
23 TDMFVRNQ control block and that the new information located in the back-up TDMFVRNQ control block
24 must be appended to the current output TDMFVRNQ control block, and the time stamp updated in the
25 TDMFVRNQ control block.

26 EXCHANGE_VRBM:

27 This routine exchanges the pointers between active and back-up TDMFVRBM control blocks. Additionally,
28 the routine calculates and updates counters within the TDMFVRBM control block header indicating the
29 number of complete cylinders and the number of individual tracks that will be either refreshed or
30 synchronized when this TDMFVRBM is used by the TDMF copy sub-task respective's sub-phase. These
31 counts in conjunction with the total I/O device service time accumulated by module TDMFSIO, when reading
32 or writing from the migration volumes, allow the code at label SET_SYNCH above, to determine if the
33 synchronization sub-phase can be accomplished within the synchronization time goal value specified by the
34 customer.

35 The TDMFVRBM control block is used as input to the refresh sub-phase and the synchronization sub-phase
36 that execute as part of the copy sub-task. The refresh and synchronization sub-phases use the back-up
37 TDMFVRBM control block to indicate which cylinders or tracks need to be refreshed during that sub-phase.
38 As cylinders and tracks are refreshed, an indication is marked in a cumulative TDMFVRBM control block
39 which indicate all cylinders or tracks that were ever refreshed during those two sub-phases.

40 CSECT: TDMFUVOL

LISTING 1

TDMF LOGIC  © 1998 AMDAHL CORPORATION

1. Set up parameters to update the COMMDS system record zero, which contains all information in the TDMFMSE, TDMFMSV, and TDMFMSVE control blocks. In addition, if this is a Slave system, request that the I/O operation also write all TDMFVRNQ control blocks. This I/O operation is performed with a call to routine CALL_ICOM. Upon completion, a call to RELEASE_COM is made in order to release control of the COMMDS for use by other systems.

2. If additional processing is required to complete the migration of any volume, a TDMF system (Master or Slave) will wait for a specified period of time as defined by the current systems response time. At the completion of the wait interval, go to BEGIN, which causes a re-read of the COMMDS and the beginning of the next TDMF processing cycle. If no additional processing is required for any volume migration, go to CSECT TDMFEVOL after setting return codes for module TDMFVOL processing.

CSECT: TDMFEVOL

The TDMF design of the COMMDS provides a repository of all messages that may be issued from any TDMF system (Master or Slave) and any messages issued concerning an individual volumes' migration. This provides an audit trail within the TDMF system that may be used during or after completion of a TDMF session using the TDMF TSO Monitor.

Set up parameters to write this systems message information and all volume migration message information located in the TDMFVMSG control blocks. Multiple calling sequences to CALL_ICOM will write this information to the COMMDS.

The TDMF design of the COMMDS provides a repository of the status of all control blocks that are used by this TDMF system (Master or Slave). This provides an audit trail within the TDMF system that may be used for diagnostic purposes during or after completion of a TDMF session using the TDMF TSO Monitor.

Set up parameters to write this systems diagnostic information located in the TDMFWORK, TDMFVRBM, and the system TDMF control blocks. Multiple calling sequences to CALL_ICOM will write this information to the COMMDS.

Call MODIFY_UCBDDT with an unchain request for all volumes involved in the migration session to ensure all modifications made to the operating system have been successfully removed. If this is a Master system, DETACH all copy sub-tasks that were created during TDMFAVOL processing. Return to the calling module, TDMFMAIN.

LISTING 1

TDMF LOGIC © 1998 AMDAHL CORPORATION

1 MODULE: TDMFIMON
2 CSECT: TDMFIMON

3     The purpose of this module is to monitor all customer I/O operations to the source and target volumes during
4     the life of an active migration session. This module implements the primary design objective within the
5     TDMF system, which is to ensure that data integrity of the target volume in that any update activity by
6     customer I/O operations that changes the data located on the source volume must be reflected to the target
7     volume. The TDMF design allows that only volumes involved in a migration session are monitored for I/O
8     operations allowing any I/O operations to volumes not involved within the TDMF migration session to not
9     be impacted in any fashion.

10    The TDMF design allows this module to receive control twice during the life of an I/O operation to a source
11    or target volume involved in a migration session. It first receives control via the Device Dependent Start I/O
12    Exit from MVS' IOS when an I/O operation attempts to start upon either the source or target volume. This
13    entry point runs as an extension, effectively, of MVS' IOS, running in Supervisor State, Protect Key Zero, and
14    is disabled for external and I/O interrupts while the MVS local and IOS UCB locks are held.

15    This entry point examines the starting request to determine if this request is for the source or target
16    volume/device involved in the TDMF migration session. Module TDMFVOL, CSECT TDMFAVOL, creates
17    a TDMFDDTE control block with it's entry address in the DDT SIO exit location pointing to the SIO main
18    entry point of this module.

19    The TDMF design demands that any errors detected or that cannot be handled by the code within this module,
20    to notify the TDMF main task executing, that it is necessary to terminate this volumes migration due to an
21    error to prevent loss of data integrity to the customers data being migrated to the target volume. The
22    TDMFIMON communicates this error condition to the TDMF main task via deactivating the I/O Monitor
23    which will be recognized by the main TDMF task in the routine logic of label CHECK_IMON in CSECT
24    TDMFTVOL of module TDMFVOL, and by similar logic within the TDMFCOPY module for the copy sub-
25    task.

26    The TDMF design requires and does not allow any customer I/O operations that would destroy information
27    located on the target volume being migrated to are prevented. If the I/O operation is being directed to a source
28    volume, the I/O operation must be allowed to continue without hindrance. In order to evaluate the successful
29    completion or non-completion of an I/O operation by the customer applications, the second entry point will
30    receive control via at this modules Disabled Interrupt Exit (DIE) address. This address is placed into the
31    IOSB in lieu of any other DIE address that may exist after saving the DIE address if necessary. The DIE
32    routine will receive control at the completion of the I/O operation on the source volume or upon receipt of an
33    interrupt due to an intermediate request (Program Control Interrupt, PCI).

34    The second entry point receives control as stated in the above paragraph and examines the channel program
35    that has just completed upon the source volume. It's purpose is to create in the case of any write operation
36    the location, cylinder and track, upon the source volume that were affected by the execution of this channel
37    program. The information is collected in an active TDMFVRNQ control block. Each executing TDMF
38    system will periodically exchange the pointers between an active and back-up TDMFVRNQ control block,
39    providing an empty TDMFVRNQ control block for additional data collection by TDMFIMON for this source
40    volumes migration. These back-up TDMFVRNQ control blocks will then be processed by the TDMF main
41    task, module TDMFVOL, CSECT TDMFMVOL in the routine EXCHANGE_VRNQ.

42    This TDMF design thus ensures data integrity based upon the architectural structure of channel programs and
43    their channel command words. Therefore, the structure of files, data sets, and/or data bases are not

LISTING 1

TDMF LOGIC © 1998 AMDAHL CORPORATION 1  compromised and cannot impact the data integrity of the TDMF design. Additionally, channel programs that
2  may be directed to a source volume that do not affect that data located upon the source volume also cannot
3  impact the data integrity of the migrating volume.

4  A third entry point is allocated to be used for potential future implementation of I/O operations using
5  suspend/resume channel operations protocol.

6  A fourth entry point is used within the TDMF system to ensure the data integrity of the COMMDS during it's
7  reserve processing sequence. This entry point provides compatibility with MVS' IOS and physical data
8  integrity regardless of the physical volume protection normally invoked by MVS' Global Resource
9  Serialization (GRS) component or replacement component used by a customer, and properly manages both
10 reserve and reserve pending conditions.

11 This component executes in 31-bit addressability mode and is protected by a Functional Recovery Routine
12 (FRR) to ensure non-destructive termination of a volumes migration and to prevent abnormal termination of
13 MVS' IOS component. Additionally, the first two entry points always validate all TDMF control blocks upon
14 receipt of control to ensure proper execution of the system. Any validation error of these control blocks results
15 in the termination of the volumes' migration.

16 STARTIO_ENTRY_POINT:

17 This entry point finds via the I/O Queue (IOQ) Element, the address of the IOSB and the address of the UCB,
18 that this I/O request is being directed to. If the TDMFDDTE control block indicates that the TDMF I/O
19 Monitor is in "quiet mode", this code returns to the standard MVS SIO Exit address that has been previously
20 saved in the TDMFDDTE control block.

21 An examination is made to determine if this I/O operation is being directed to a target volume. If so, the
22 Channel Command Words (CCWs) in the channel program are examined to determine if the I/O operation
23 is attempting to modify the data upon the target volume or to read data upon the target volume other than the
24 volume serial number. If so, this I/O operation is terminated with a special return code to MVS' IOS to
25 indicate that this I/O operation is being prevented. If the I/O request is attempting to read the target volume
26 serial number or is not accessing, in any fashion, any other data on the target volume, allow the I/O operation
27 to continue normally.

28 If the I/O operation is being directed to a source volume, the address stored in the IOSDIE field of the IOSB,
29 if it exists, is saved in the TDMFDDTE. The address in the IOSDIE field of the IOSB is then replaced with
30 an address to provide re-entry into the second TDMFIMON entry point.

31 In order to allow the continuation of an I/O operation normally, control is then passed to the normal MVS
32 DDT SIO entry point that has been previously saved.

33 DISABLED_INTERRUPT_EXIT_ENTRY_POINT:

34 This entry point is passed the address of the IOSB and the UCB address, that this I/O request is being directed
35 to. If the TDMFDDTE control block indicates that the TDMF I/O Monitor is in "quiet mode", this code
36 returns to the caller which is MVS' IOS if no IOSDIE address was saved in the TDMFDDTE control block
37 or to the address that was saved in the TDMFDDTE control block during the previous entry point processing.

38 If the IOSB contains a IOSDIE address that was saved, call that routine and after processing by that routine,
39 the routine will return to this module. The IOSDIE pointer in the IOSB is normally used to transfer control
40 to a customer supplied routine to be used in the case of a Program Controlled Interrupt (PCI). The PCI
41 routine receiving control might dynamically modify the CCWs within the channel program based up

LISTING 1

TDMF LOGIC　　　　　　　　　　　　　　　　　　　　　　　　　© 1998 AMDAHL CORPORATION 1　application I/O operational requirements. In order to ensure transparency to the customers specified PCI exit
2　routine or DIE routine, the IOSDIE address is temporarily restored to it's original value during the life of
3　execution of the PCI/DIE routine specified. Upon return to the TDMFIMON routine, which effectively
4　appears to the PCI/DIE routine as MVS IOS, the IOSDIE routine address in the IOSB is again restored to the
5　address of the DISABLED_INTERRUPT_EXIT_ENTRY_POINT above. This ensures in the case of a non-
6　terminating or non-ending I/O operation that the TDMFIMON DIE entry point will again receive control
7　during presentation of the next I/O interrupt which may either be another intermediate (PCI) interrupt or the
8　final I/O interrupt signaling completion of the channel program.

9　CCW_SCAN_LOOP:

10　The channel program that has received an I/O interrupt, is scanned from the first CCW that has not been
11　previously scanned until the last CCW that has been executed. During this scan, each CCW operation code
12　(op code) is used to index into a translate and test table providing multiple functions. The first is the address
13　of a routine to receive control due to the appearance of the specified CCW op code. The second is the virtual
14　address of the specified data operand in the CCW after being converted from a real address to a virtual
15　address. The third is an indication whether this virtual address may be used by the receiving dependent op
16　code routine.

17　If a dependent op code routine requires that the virtual address exist, and is not available for use by the
18　dependent op code routine, an error indication is signaled and the volume migration termination request is
19　invoked. This may occur if the operating system pages out the MVS Page Table Entries for the address space
20　issuing the I/O operation.

21　There are actually two translate and test tables associated with the channel command op code scanning
22　mechanism. One table is used for standard 388x control units and the other for 399x control units.

23　The dependent op code routine address returned may be the address of a CCW ignore routine. Which infers
24　that this operation code does not require further examination. An example of this would be an CCW op code
25　for a read operation of any type, since a read op code does not affect data integrity. The dependent op code
26　address returned may be an address of an invalid CCW op code routine which infers that this op code may
27　not be used during the life of the migration process as it may inadvertently affect the data integrity of the
28　volume in an unknown fashion. An example of this would be the existence of a diagnostic write CCW op
29　code.

30　A normal dependent op code routine will receive control and save any appropriate control information that
31　may be used later in the processing of the channel program and if the I/O operation indicates that any write
32　operation is occurring on the source volume, calls the UPDATE_VRNQ routine.

33　Upon completion of this dependent op code routine and optional call to the UPDATE_VRNQ routine, the
34　scanning mechanism continues with the next CCW to be processed.

35　Upon completion of the scan of the channel program, return to the MVS IOS caller.

36　UPDATE_VRNQ:

37　Build the Volume Refresh Notification Queue (VRNQ) entries in the active TDMFVRNQ control block. Each
38　entry consists of a sixteen-bit half-word entry indicating the affected cylinder number of the source volume
39　that is being updated, a eight-bit (one byte) starting track number of that cylinder on the source volume that
40　is being updated and an eight-bit (one byte) number of consecutive tracks that are being affected by this write
41　operation. In order to conserve entries in the TDMFVRNQ control block, intelligence is provided to
42　recognize the consecutive I/O operations that might be updating adjacent tracks on the same cylinder will

LISTING 1

TDMF LOGIC  © 1998 AMDAHL CORPORATION 1  attempt to use the same VRNQ entry. For example, a write I/O operation on cylinder 25, tracks 2 and 3,
2  would create an entry of cylinder 25, starting track 2 for a length of 2 tracks. If a subsequent I/O operation
3  updates cylinder 25, tracks 4 and 5, the previous VRNQ entry will be changed to that of cylinder 25, starting
4  track 2 for a length of 4 tracks.
5  There are cases when using keyed operations for searching purposes, that the system cannot determine the
6  actual track number within that cylinder that the I/O operation may affect. In that case, a VRNQ entry
7  encompassing the complete cylinder is created. For example, an entry of cylinder 25, starting track zero, with
8  the number of tracks equal to 15, which is the maximum number of tracks per cylinder within the current
9  DASD architecture supported.
10

LISTING 1

TDMF LOGIC  © 1998 AMDAHL CORPORATION

1 MODULE: TDMFCOPY

2 CSECT: TDMFCOPY

3 The purpose of this module is to provide the functions required by the TDMF copy sub-task, which is attached
4 as a sub-task by module TDMFVOL, CSECT TDMFAVOL, which is created with an ATTACHX macro
5 during its processing. This module implements three sub-task phases: the copy sub-phase, the refresh sub-
6 phase, and the synchronization sub-phase. Additionally, a preceding sub-phase to the copy sub-phase may
7 be executed if the customer requested the purge option when migrating from a source volume of one size to
8 a target volume of a larger size. This module executes in 31-bit mode, Supervisor State, Protect Key Zero.

9 This module contains a MVS Extended Set Task Abend Exit (ESTAE) recovery routine. This routine ensures
10 that the TDMFCOPY sub-task receives control in the event that the TDMF copy sub-task attempts an abend
11 condition. If any sub-phase below is posted with a termination request, the sub-phase and the copy sub-task
12 are terminated with an error condition.

13 When migrating a source volume to a larger target volume, meaning that the target volume contains more
14 cylinders than the source volume. If the customer does not request the optional purge request, go to
15 VOLUME_COPY. If the purge option is requested, prior to the copy sub-phase, each cylinder on the target
16 volume is effectively erased starting with the number of cylinders existing upon the source volume plus one
17 until the last cylinder of the target volume has been erased.

18 VOLUME_COPY:

19 This is the copy sub-phase. Prior to the read operation of each cylinder, call CHECK_IMON. Each cylinder
20 on the source volume is read a cylinder at a time, and written a cylinder at a time to the target volume, starting
21 with cylinder zero until the last cylinder of the source volume has been read and written to the target volume.
22 These I/O operations are requested based upon parameters passed to module TDMFIVOL, CSECT
23 TDMFIVOL.

24 VOLUME_REFRESH:

25 This is the refresh sub-phase. The back-up TDMFVRBM control block is used to indicate the cylinders and
26 tracks that require a refresh pass. A Volume Refresh Bit Map (VRBM) entry consists of a sixteen-bit half-
27 word field. Bit 15 of the half-word indicates that all the information located upon that cylinder represented
28 by this entry must be refreshed, meaning all tracks read from the source volume and written to the target
29 volume. If bit 15 is off, and any other bits (zero through 14) are equal to one, those respective bits indicate
30 which selective tracks must be read from the designated cylinder on the source volume and copied to the
31 respective cylinder on the target volume.

32 Prior to the read operation of each cylinder, call CHECK_IMON. Each cylinder on the source volume is read
33 a cylinder as specified, and written a cylinder as specified to the target volume, starting with cylinder zero
34 until the all VRNQ entries have been processed. These I/O operations are requested based upon parameters
35 passed to module TDMFIVOL, CSECT TDMFIVOL. As complete cylinders and/or individual tracks are
36 copied from the source volume to the target volume, this information is propagated to the cumulative
37 TDMFVRBM control block, signifying that these cylinders and/or tracks have been refreshed.

38 The refresh sub-phase then waits until it has been posted by the TDMF main task as to whether to continue
39 to the synchronization sub-phase or to begin processing a subsequent VOLUME_REFRESH pass.

40 VOLUME_SYNCHRONIZATION:

LISTING 1

TDMF LOGIC  © 1998 AMDAHL CORPORATION

This is the synchronization sub-phase. The back-up TDMFVRBM control block is used to indicate the cylinders and tracks that require a refresh pass. A Volume Refresh Bit Map (VRBM) entry consists of a sixteen-bit half-word field. Bit 15 of the half-word indicates that all the information located upon that cylinder represented by this entry must be refreshed, meaning all tracks read from the source volume and written to the target volume. If bit 15 is off, and any other bits (zero through 14) are equal to one, those respective bits indicate which selective tracks must be read from the designated cylinder on the source volume and copied to the respective cylinder on the target volume.

Prior to the read operation of each cylinder, call CHECK_IMON. Each cylinder on the source volume is read a cylinder as specified, and written a cylinder as specified to the target volume, starting with cylinder zero until the all VRNQ entries have been processed. These I/O operations are requested based upon parameters passed to module TDMFIVOL, CSECT TDMFIVOL. As complete cylinders and/or individual tracks are copied from the source volume to the target volume, this information is propagated to the cumulative TDMFVRBM control block, signifying that these cylinders and/or tracks have been synchronized.

Upon completion, the ECB upon which the TDMF main task is waiting synchronization complete, is posted.

VOLUME_COMPARE:

This is a optional post copy sub-task function. If the customer did not request the compare option, go to POST_ECB. Prior to the read operation of each cylinder, call CHECK_IMON. Each cylinder on the source volume is read a cylinder at a time, and each cylinder on the target volume is read a cylinder at a time. At the completion of these read operations, the data read from both volumes is compared, byte-by-byte, to ensure data integrity has not been compromised. This operation starts with cylinder zero until the last cylinder of the source volume has been read and compared to the target volume. These I/O operations are requested based upon parameters passed to module TDMFIVOL, CSECT TDMFIVOL.

POST_ECB:

Upon completion, the ECB upon which the TDMF main task is waiting synchronization complete, is posted.

CHECK_IMON:

If the main TDMF task has requested termination of the copy sub-phase, return to the caller. If the I/O Monitor is not active, return to the caller signaling that the I/O Monitor is "dead". Invoke termination of volume migration. This check is made for both the source and target volumes in the migration pair. If the TDMFDDTE control block is not properly chained to the MVS UCB, return the same error condition.

LISTING 1

TDMF LOGIC © 1998 AMDAHL CORPORATION

1 MODULE: TDMFICOM
2 CSECT: TDMFICOM

3    The purpose of this module is to generate channel programs consisting of Channel Command Words (CCWs)
4    to implement I/O operations being requested to the Communications Data Set (COMMDS) via parameters
5    passed by the caller. The caller may request that the system initialize the COMMDS, or to selectively read
6    or write caller specified TDMF control blocks as required by the caller. This module is called from the TDMF
7    main task only.

8    This module contains a MVS Extended Set Task Abend Exit (ESTAE) recovery routine. This routine ensures
9    that the TDMFICOM module receives control in the event that the TDMFICOM module attempts an abend
10    condition. This code executes in 31-bit mode, Supervisor State, Protect Key Zero and is enabled for I/O and
11    external interrupts. The program generates CCWs only in format one CCW format.

12    The TDMF design provides that all control blocks are 4K in length or a logical multiple of 4K in length, or
13    that multiple control blocks may exist evenly into one 4K page. Although the COMMDS may reside upon
14    either a 3380 or 3390 device type track, in order to provide compatibility, only ten data records, each 4K in
15    length, are used on any track within the COMMDS to contain the TDMF control blocks. During the
16    initialization process of the COMMDS, if the tracks are allocated on a 3390 device type, two additional data
17    records are written on each track containing dummy records. Due to the design of the TDMF COMMDS,
18    multiple write operations from multiple TDMF systems may be executed simultaneously to all cylinders within
19    the COMMDS without reserve/release protections, except logical cylinder zero of the COMMDS. This is due
20    to each TDMF system is allocated a cylinder into which the respective information about that system may be
21    written without regard to another system writing to the same cylinder. In other words, the Master system
22    (system number one) always writes its data onto relative cylinder one. The first Slave system (system number
23    two) writes its data on logical cylinder two, and so on.

24    The format of each cylinder allocated to a system, provides up to 64 TDMFVMSG control blocks to be written
25    across tracks zero through six of the specified cylinder. The last six records of track six on the specified
26    cylinder will remain as dummy formatted records. The TDMFWORK control block and its imbedded source
27    and target TDMFDDTE entries, each currently only require 2K. Therefore, two TDMFWORK/TDMFDDTE
28    control blocks may be written within one 4K page. Tracks seven through ten of the specified cylinder will
29    contain all TDMFWORK/TDMFDDTE control block information for up to 64 volumes. The last eight
30    records of track ten on the specified cylinder will remain as dummy formatted records. Track eleven on the
31    specified cylinder will contain all records related to the main TDMF control block for the specified system.
32    This contains information including system messages, messages that may have been received from the TDMF
33    TSO Monitor from the TDMFTSOM control block, plus information from the TDMF authorization checking
34    mechanisms. This information currently requires four records and thus, the additional six records will remain
35    as dummy formatted records. Tracks twelve through fourteen currently contain only formatted dummy
36    records and are available for future expansion.

37    After all cylinders allocated to systems in the TDMF session are formatted, the rest of the extent allocated to
38    the COMMDS is formatted with dummy records. The first of these cylinders is later used to contain the
39    cumulative TDMFVRBM control block representing the map of all cylinders and tracks that were updated
40    during the refresh and synchronization sub-phases during the volumes migration.

41    Logical cylinder zero contains what is referred to as System Record Zero on tracks zero and one of that logical
42    cylinder. System Record Zero consists of 20 4K pages containing all the information in the TDMFMSE,
43    TDMFMSV, and TDMFVSVE control blocks, collectively. Relative tracks two through 14 on logical cylinder

LISTING 1

TDMF LOGIC © 1998 AMDAHL CORPORATION 1  zero contain specified locations to hold the TDMFVRNQ control blocks required by the TDMF session. Since
2  only ten records per track are allowed to contain data, there are thirteen tracks that may contain all possible
3  TDMFVRNQ control blocks within the TDMF session as currently implemented.

4  An artificial implementation restriction has been placed into the TDMF design to limit the number of systems
5  involved in a TDMF migration session times the number of volumes within the migration session may not
6  exceed 128. This architectural implementation restriction could and may be removed in future releases of
7  TDMF as required by using additional cylinders to contain the TDMFVRNQ control blocks. In order to limit
8  the impact upon I/O operations to the COMMDS during the initial releases of TDMF, it was felt that this
9  artificial implementation restriction would be of a minor impact to customer requirements.

10  Architecturally, the TDMF system was designed to support 32 operating systems and 64 volumes within one
11  TDMF session.

12  All I/O operations to the COMMDS represented by an IOSB contain an IOSLEVEL of one, indicating normal
13  priority, and that miscellaneous driver is being used and that the IOSB is using command chaining, the
14  channel program is complete, and that the MVS Input/Output Supervisor should by-pass channel program
15  prefixing. This prevents any manipulation of the constructed channel programs by MVS' IOS component.

16  INITIALIZE_COMMDS:

17  This routine is used to initialize the COMMDS and to generate channel programs consisting of Channel
18  Command Words (CCWs). It may only be called by the TDMF Master system. It formats the complete extent
19  upon the DASD volume allocated to the COMMDS with dummy records and then re-writes system record
20  zero.

21  Additionally, during formatting, the information in the TDMFMSE, TDMFMSV, TFMFMSVE, and
22  TDMFWORK control blocks, is updated to contain the assigned cylinder, track and record locations.

23  During formatting the information within the COMMDS is protected via a hardware reserve CCW to prevent
24  access from another system until the formatting is complete. A routine is called to build the Service Request
25  Block (SRB) and the Input/Output Supervisor control Block (IOSB) which represent each I/O request during
26  the initialization process. This SRB/IOSB pair is passed to the TDMFSIO module to actually issue the I/O
27  request and await its completion by the operating system. Upon completion of the I/O operation, control is
28  returned to the calling module.

29  Call module TDMFAUTH for verification of authorized CPU environment.

30  READ_COMMDS:

31  This routine is used to generate a channel program consisting of Channel Command Words (CCWs) and to
32  selectively read user specified TDMF control blocks or a combination thereof, from the COMMDS.
33  Additionally, if the user requests information located in system record zero, the system provides a hardware
34  reserve CCW to prevent access from another system until the update of system record zero is subsequently
35  requested and a release operation is performed. If the reserve CCW has been added, the subsequent IOSB
36  below, will contain the DIE address located in module TDMFIMON's fourth entry point.

37  A routine is called to build the Service Request Block (SRB) and the Input/Output Supervisor control Block
38  (IOSB) which represent each I/O request during the initialization process. This SRB/IOSB pair is passed to
39  the TDMFSIO module to actually issue the I/O request and await its completion by the operating system.
40  Upon completion of the I/O operation, control is returned to the calling module.

LISTING 1

TDMF LOGIC  © 1998 AMDAHL CORPORATION

1  If this is the first read of the COMMDS by a Slave system, call module TDMFAUTH for verification of
2  authorized CPU environment.
3  UPDATE_COMMDS:
4  This routine is used to generate a channel program consisting of Channel Command Words (CCWs) and to
5  selectively update/write user specified TDMF control blocks or a combination thereof, to the COMMDS.
6  A routine is called to build the Service Request Block (SRB) and the Input/Output Supervisor control Block
7  (IOSB) which represent each I/O request during the initialization process. This SRB/IOSB pair is passed to
8  the TDMFSIO module to actually issue the I/O request and await its completion by the operating system.
9  Upon completion of the I/O operation, control is returned to the calling module.
10

LISTING 1

TDMF LOGIC © 1998 AMDAHL CORPORATION

1 MODULE: TDMFIVOL
2 CSECT: TDMFIVOL
3 The purpose of this module is to generate channel programs consisting of Channel Command Words (CCWs)
4 to implement I/O operations being requested to volumes being migrated by the TDMF session via parameters
5 passed by the caller. The caller may request that the system:
6 - read all tracks of data from the specified volume on a cylinder;
7 - read a single track of data from the specified volume on a specified cylinder;
8 - selectively read non-adjacent tracks of data from the specified volume on a specified cylinder;
9 - write all tracks of data from the specified volume on a cylinder;
10 - write a single track of data from the specified volume on a specified cylinder;
11 - selectively write non-adjacent tracks of data from the specified volume on a specified cylinder;
12 - provide miscellaneous I/O functions as specified by the caller.
13 Miscellaneous I/O functions include items such as, Read Device Characteristics information, Sense ID
14 information, Sense Subsystem Status information, Read Configuration Data information, Read Volume Label
15 information, Write Volume information, reserve the volume, and release the volume.
16 This module may be called from both the TDMF main task or a TDMF copy sub-task.
17 This module contains a MVS Extended Set Task Abend Exit (ESTAE) recovery routine. This routine ensures
18 that the TDMFIVOL module receives control in the event that the TDMFIVOL module attempts an abend
19 condition. This code executes in 31-bit mode, Supervisor State, Protect Key Zero and is enabled for I/O and
20 external interrupts. The program generates CCWs only in format one CCW format.
21 READ_SOURCE_CYL:
22 This routine is used to generate a channel program consisting of Channel Command Words (CCWs) and to
23 selectively read all tracks upon the caller specified cylinder from the user specified volume.
24 A routine is called to build the Service Request Block (SRB) and the Input/Output Supervisor control Block
25 (IOSB) which represent each I/O request during the initialization process. This SRB/IOSB pair is passed to
26 the TDMFSIO module to actually issue the I/O request and await its completion by the operating system.
27 Upon completion of the I/O operation, control is returned to the calling module.
28 READ_SOURCE_TRK:
29 This routine is used to generate a channel program consisting of Channel Command Words (CCWs) and to
30 selectively read the caller specified track from the user specified volume.
31 A routine is called to build the Service Request Block (SRB) and the Input/Output Supervisor control Block
32 (IOSB) which represent each I/O request during the initialization process. This SRB/IOSB pair is passed to
33 the TDMFSIO module to actually issue the I/O request and await its completion by the operating system.
34 Upon completion of the I/O operation, control is returned to the calling module.
35 All I/O operations to a requested volume are represented by an IOSB, which contains an IOSLEVEL of the
36 specified IOSLEVEL of Dynamic Device Reconfiguration (DDR), and that a miscellaneous driver is being
37 used and that the IOSB is using command chaining, the channel program is complete, and that the MVS

LISTING 1

TDMF LOGIC © 1998 AMDAHL CORPORATION 1,2: Input/Output Supervisor should by-pass channel program prefixing. This prevents any manipulation of the constructed channel programs by MVS' IOS component.

3,4: The setting of the IOSLEVEL to that used by DDR ensures that I/O operations may be requested against a migrating volume and even if the volume is logically quiesced.

5: READ_SOURCE_SEL:

6,7,8: This routine is used to generate a channel program consisting of Channel Command Words (CCWs) and to selectively read specific tracks from the caller specified cylinder from the user specified volume. Multiple tracks may be read with one request and are not required to be adjacent.

9,10,11,12: A routine is called to build the Service Request Block (SRB) and the Input/Output Supervisor control Block (IOSB) which represent each I/O request during the initialization process. This SRB/IOSB pair is passed to the TDMFSIO module to actually issue the I/O request and await its completion by the operating system. Upon completion of the I/O operation, control is returned to the calling module.

13: WRITE_TARGET_CYL:

14,15: This routine is used to generate a channel program consisting of Channel Command Words (CCWs) and to selectively write all tracks upon the caller specified cylinder from the user specified volume.

16,17,18,19: A routine is called to build the Service Request Block (SRB) and the Input/Output Supervisor control Block (IOSB) which represent each I/O request during the initialization process. This SRB/IOSB pair is passed to the TDMFSIO module to actually issue the I/O request and await its completion by the operating system. Upon completion of the I/O operation, control is returned to the calling module.

20: WRITE_TARGET_TRK:

21,22: This routine is used to generate a channel program consisting of Channel Command Words (CCWs) and to selectively write the caller specified track from the user specified volume.

23,24,25,26: A routine is called to build the Service Request Block (SRB) and the Input/Output Supervisor control Block (IOSB) which represent each I/O request during the initialization process. This SRB/IOSB pair is passed to the TDMFSIO module to actually issue the I/O request and await its completion by the operating system. Upon completion of the I/O operation, control is returned to the calling module.

27: WRITE_TARGET_SEL:

28,29,30: This routine is used to generate a channel program consisting of Channel Command Words (CCWs) and to selectively write specific tracks from the caller specified cylinder from the user specified volume. Multiple tracks may be written with one request and are not required to be adjacent.

31,32,33,34: A routine is called to build the Service Request Block (SRB) and the Input/Output Supervisor control Block (IOSB) which represent each I/O request during the initialization process. This SRB/IOSB pair is passed to the TDMFSIO module to actually issue the I/O request and await its completion by the operating system. Upon completion of the I/O operation, control is returned to the calling module.

35: MISC_CCW:

36,37: This routine is used to generate a channel program consisting of a Channel Command Word (CCW) to perform the caller specified I/O operation.

38,39: A routine is called to build the Service Request Block (SRB) and the Input/Output Supervisor control Block (IOSB) which represent each I/O request during the initialization process. This SRB/IOSB pair is passed to

LISTING 1

TDMF LOGIC © 1998 AMDAHL CORPORATION 1     the TDMFSIO module to actually issue the I/O request and await its completion by the operating system.
2     Upon completion of the I/O operation, control is returned to the calling module.
3

LISTING 1

TDMF LOGIC © 1998 AMDAHL CORPORATION

1 MODULE: TDMFSIO

2 CSECT: TDMFSIO

3    The purpose of this module is to issue a request to MVS' Input/Output Supervisor (IOS) component to
4    perform the I/O operation represented by the Input/Output Supervisor control Block (IOSB) in conjunction
5    with its Service Request Block (SRB) as requested by the caller. This module may be called from module
6    TDMFICOM and module TDMFIVOL. Upon completion of the I/O operation requested, control will be
7    returned to the calling module.

8    This module executes in 31-bit mode, Supervisor State, Protect Key Zero. This module contains a MVS
9    Extended Set Task Abend Exit (ESTAE) recovery routine. This routine ensures that the TDMFSIO module
10    receives control in the event that the TDMFSIO module attempts an abend condition.

11    Before passing the I/O request to the IOS component, the module ensures that the device containing the
12    volume to which the I/O operation is to be directed, is online and has available channel paths. If not, an error
13    indication is returned to the caller. Since the TDMF design requires, in some cases, that I/O operations be
14    attempted to a device and/or volume while I/O operations are logically quiesced, the normal MVS STARTIO
15    macro cannot be used. This is because the MVS STARTIO compatibility interface routine, module
16    IECVSTIO, will reset the IOSLEVEL in the IOSB to a value that may be incompatible to successfully
17    complete the I/O operation. Therefore, the TDMF design requires an implementation that calls module
18    IOSVSSEQ directly, so that the I/O operation may be completed even if the device and/or volume is
19    considered quiesced.

20    Upon completion of the I/O operation requested, the elapsed time of the I/O operation is calculated, which
21    provides device service time information. This device service time information is required for use by the
22    TDMF TSO Monitor and the routine called EXCHANGE_VRBM in CSECT TDMFMVOL of module
23    TDMFVOL.

24    The I/O operation is checked for any error conditions upon its completion and an indication returned to the
25    caller of the success or failure of the I/O operation.

26    The module contains a normal and abnormal channel end appendage routines and a post routine to be used
27    as routines called by MVS' IOS component.

LISTING 1

TDMF LOGIC © 1998 AMDAHL CORPORATION

1 TRANSPARENT DATA MIGRATION FACILITY TSO MONITOR SYSTEM
2
3 REXX EXEC: TDMF
4 The initial REXX EXEC sets up an environment under Interactive Structure Program Facility (ISPF),
5 allocates all library definitions required for use for the TDMF TSO Monitor and goes to REXX EXEC
6 TDMFMON.
7
8 REXX EXEC: TDMFMON
9 Displays the beginning panels and upon ENTER command, processes the options as specified below.
10 OPTION 1:
11 Enters standard ISPF EDIT mode, allowing the customer to edit the supplied sample TDMF JCL library and
12 submit TDMF jobs to the MVS operating system Job Entry Subsystem (JES).
13 OPTION 2:
14 Calls module TDMFWTCH which displays pertinent information for all volume migration status within all
15 TDMF sessions that are currently active.
16 OPTION 3:
17 Calls module TDMFMSGS which displays all messages for all volume migrations within the customer
18 specified active TDMF session.
19 OPTION 4:
20 Calls module TDMFPERF which displays performance information for all volume migrations within the
21 customer specified active TDMF session. This information can also be displayed for a TDMF session has
22 previously completed.
23 OPTION5:
24 Calls module TDMFVPST which displays all messages for all volume migrations within the customer
25 specified previously completed TDMF session.
26 OPTION 6:
27 Implements options to provide diagnostic and support information.
28 OPTION 6.1:
29 Calls module TDMFSTAT which displays general information about an active TDMF session and its use of
30 the COMMDS.
31 OPTION 6.2:
32 Displays the memory location for the length specified as accomplished as a part of the TDMFMON REXX
33 EXEC.
34 OPTION 6.3:
35 Calls module TDMFCOMF which displays the control blocks requested by control block name.

LISTING 1

TDMF LOGIC © 1998 AMDAHL CORPORATION

1. OPTION 6.4:
2. Calls module TDMFCNAV which displays specified cylinder, track and record from the requested COMMDS.
3. OPTION 7:
4. Calls module TDMFTMON which provides an operator interface mechanism that may be used to either
5. terminate an active volume migration, respond to the synchronization prompt, and modify the synchronization
6. goal time value, in seconds, dynamically.
7. OPTION 8:
8. Calls module TDMFUNIQ which displays customer and site information with the additional capability to
9. dynamically add or delete authorization keys, which allows TDMF to execute upon an authorized CPU
10. processor.
11. MODULE: TDMFSECR
12. Initializes the authorization keys within the specified library, which allows TDMF to execute upon an
13. authorized CPU processor.
14. MODULE: TDMFAUTH
15. This module provides the actual authority checking to determine if the CPU is authorized to execute TDMF. This
16. module can be called by modules TDMFSECR, TDMFUNIQ, or TDMFICOM, executing as a part of the main task
17. during TDMF execution.
18.

While the invention has been particularly shown and described with reference to preferred embodiments thereof it will be understood by those skilled in the art that various changes in form and details may be made therein without departing from the spirit and scope of the invention.

What is claimed is:

1. A computer system having a plurality of storage volumes for storing data used in the computer system, one or more storage control units for controlling I/O transfers of data in the computer system from and to the storage volumes, one or more application programs for execution in the computer system using data accessed from and to the storage volumes, one or more operating system programs for execution in the computer system for controlling the storage volumes, the one or more storage control units and the one or more application programs, and a data migration program for migrating data from one of said volumes designated as a source volume to one of said volumes designated a target volume while said one or more application programs are executing using data accessed from and to the storage volumes, said data migration program including,

- a main module to control the start of a migration session when said one or more application programs are using data accessed to and from the source volume, to migrate data from the source volume to the target volume, and to end the migration session whereby said one or more application programs are using data accessed to and from the target volume,
- a volume module to control said storage volumes during the migration session,
- a copy module to control the copying of data from the source volume to the target volume during the migration session,
- a monitor module for monitoring I/O transfers to the storage volumes during the migration session.

2. The computer system of claim 1 wherein said main module includes a communication data set for communications used for controlling data migration that is not stored on said source volume or said target volume.

3. The computer system of claim 1 wherein said main module establishes said migration session as a plurality of migration phases for controlling data migration.

4. The computer system of claim 1 wherein each of said one or more operating system programs includes an instance of said data migration program and said main module establishes one instance of said data migration program as a master instance and another instance of said data migration program as a slave whereby said migration session is controlled in a master slave relationship.

5. The computer system of claim 1 wherein said main module establishes said migration session as a plurality of migration phases including an activation phase, a copy phase, a refresh phase, a quiesce phase, a synchronize phase, a redirect phase, a resume phase and a termination phase.

6. The computer system of claim 1 wherein each of said one or more operating system programs includes an instance of said data migration program and said main module establishes a plurality of migration sessions for concurrent data migrations.

7. The computer system of claim 6 wherein for each of said data migration sessions each of said operating systems includes an instance of said data migration program and said main module establishes one instance of said data migration program as a master instance and another instance of said data migration program as a slave whereby each of said migration sessions is controlled in a master slave relationship.

* * * * *